United States Patent
Tsubata et al.

(10) Patent No.: US 8,537,324 B2
(45) Date of Patent: Sep. 17, 2013

(54) COLOR FILTER SUBSTRATE, METHOD OF MAKING THE COLOR FILTER SUBSTRATE AND DISPLAY DEVICE INCLUDING THE COLOR FILTER SUBSTRATE

(75) Inventors: Toshihide Tsubata, Tsu (JP); Tsuyoshi Tokuda, Tsu (JP); Yuhko Hashimoto, Matsusaka (JP); Yoshinori Kinai, Matsusaka (JP); Masayuki Tsuji, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 844 days.

(21) Appl. No.: 12/192,942

(22) Filed: Aug. 15, 2008

(65) Prior Publication Data
US 2008/0309859 A1 Dec. 18, 2008

Related U.S. Application Data

(62) Division of application No. 11/148,379, filed on Jun. 9, 2005, now Pat. No. 7,433,004.

(30) Foreign Application Priority Data

Jun. 11, 2004 (JP) .................................. 2004-174693

(51) Int. Cl.
*G02F 1/1333* (2006.01)
*G02F 1/1335* (2006.01)
*G02F 1/1339* (2006.01)

(52) U.S. Cl.
USPC .............. 349/155; 349/106; 349/88; 349/156

(58) Field of Classification Search
USPC ..................................... 349/88, 106, 155–156
See application file for complete search history.

(56) References Cited

U.S. PATENT DOCUMENTS

| | | | |
|---|---|---|---|
| 6,211,937 B1 * | 4/2001 | Miyachi et al. ................ | 349/156 |
| 6,323,921 B1 | 11/2001 | Kurauchi et al. | |
| 6,667,790 B2 * | 12/2003 | Yanagawa et al. ............. | 349/139 |
| 6,671,025 B1 | 12/2003 | Ikeda et al. | |
| 6,683,671 B1 | 1/2004 | Morimoto | |
| 6,870,593 B2 | 3/2005 | Satoh | |
| 6,989,883 B2 * | 1/2006 | Park et al. ...................... | 349/155 |
| 7,345,731 B2 * | 3/2008 | Sumi et al. ..................... | 349/155 |

(Continued)

FOREIGN PATENT DOCUMENTS

| | | |
|---|---|---|
| CN | 1501129 A | 6/2004 |
| JP | 05-196946 A | 8/1993 |

(Continued)

*Primary Examiner* — Huyen Ngo
(74) *Attorney, Agent, or Firm* — Birch, Stewart, Kolasch & Birch, LLP

(57) ABSTRACT

A color filter substrate includes: a base substrate; a light-shield layer and a color filter layer provided on the base substrate; a plurality of columnar spacers, made of a resin and provided to stick out of the base substrate; and an undercoat layer, provided between the columnar spacers and the base substrate. The color filter layer includes first, second, and third types of color filters, which transmit light rays in mutually different colors. The undercoat layer is made of the same film as one of the first, second and third types of color filters and the light-shield layer. A portion of the undercoat layer, associated with a first one of the columnar spacers, has a different area and/or shape from another portion of the undercoat layer, associated with a second one of the columnar spacers. The first and second columnar spacers have mutually different heights.

4 Claims, 17 Drawing Sheets

(56) References Cited

U.S. PATENT DOCUMENTS

| | | |
|---|---|---|
| 2001/0026347 A1 | 10/2001 | Sawasaki et al. |
| 2003/0090609 A1 | 5/2003 | Inoue et al. |
| 2003/0123018 A1 | 7/2003 | Kim et al. |
| 2003/0156236 A1 | 8/2003 | Yamada |
| 2003/0214623 A1* | 11/2003 | Ebisu et al. .................. 349/156 |
| 2004/0141142 A1 | 7/2004 | Choi et al. |
| 2005/0185129 A1* | 8/2005 | Kim et al. .................. 349/156 |
| 2005/0190338 A1* | 9/2005 | Lim .............................. 349/156 |
| 2006/0203177 A1 | 9/2006 | Cho et al. |

FOREIGN PATENT DOCUMENTS

| | | |
|---|---|---|
| JP | 09-043425 A | 2/1997 |
| JP | 2001-051266 A | 2/2001 |
| JP | 2002-341354 A | 11/2002 |
| JP | 2003-121857 A | 4/2003 |
| JP | 2003-131239 A | 5/2003 |
| JP | 2005-122150 A | 5/2005 |
| TW | 567380 B | 12/2003 |

* cited by examiner

UNDERCOAT LAYER

LAYER RIGHT ON THE UNDERCOAT LAYER

UNDERCOAT LAYER

LAYER RIGHT ON THE UNDERCOAT LAYER

UNDERCOAT LAYER

LAYER RIGHT ON THE UNDERCOAT LAYER

UNDERCOAT LAYER

LAYER RIGHT ON THE UNDERCOAT LAYER

16" VERTICAL ALIGNMENT TYPE
CELL GAP OF 3.4 μm

12" VERTICAL ALIGNMENT TYPE
CELL GAP OF 3.2 μm

680mm

880mm

ASPECT RATIO OF 15:9
45" VERTICAL ALIGNMENT TYPE
CELL GAP OF 3.7 μm

1500mm

1800mm

ASPECT RATIO OF 4:3
24" VERTICAL ALIGNMENT TYPE
CELL GAP OF 3.4 μm

AREA ($\mu m^2$) OF UNDERCOAT LAYER MADE OF
THE SAME FILM AS LIGHT-SHIELD LAYER

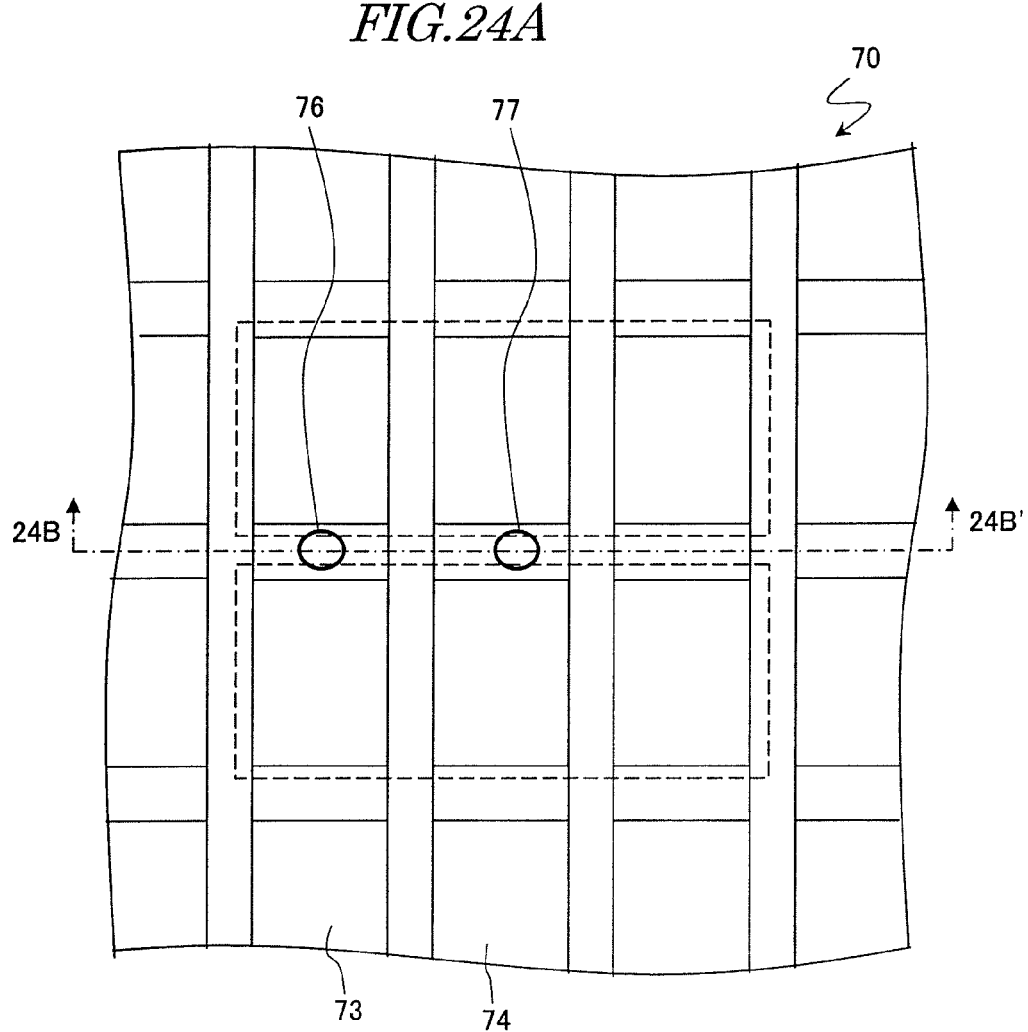
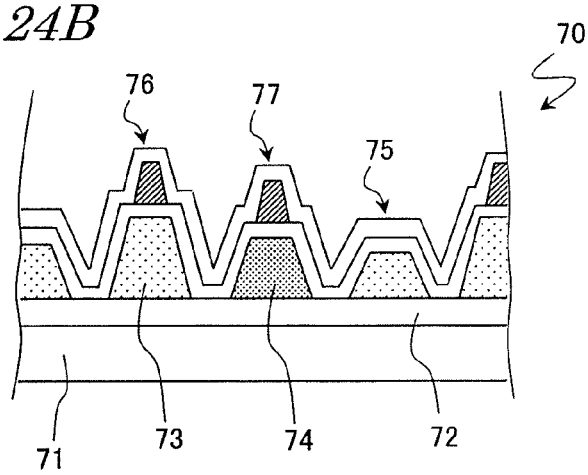

COLOR FILTER SUBSTRATE, METHOD OF MAKING THE COLOR FILTER SUBSTRATE AND DISPLAY DEVICE INCLUDING THE COLOR FILTER SUBSTRATE

CROSS-REFERENCE PARAGRAPH

This application is a Divisional of application Ser. No. 11/148,379 filed on Jun. 9, 2005, now U.S. Pat. No. 7,433,004 and for which priority is claimed under 35 U.S.C. §120; and this application claims priority of Japanese Patent Application No. 2004-174693 filed in Japan on Jun. 11, 2004 under 35 U.S.C. §119; the entire contents of all are hereby incorporated by reference.

BACKGROUND OF THE INVENTION

1. Field of the Invention

The present invention relates to a color filter substrate for a display device and more particularly relates to a color filter substrate including columnar spacers. The present invention also relates to a method of making such a color filter substrate and to a display device including such a color filter substrate.

2. Description of the Related Art

In color LCDs used extensively today, a color filter is provided for each and every picture element (dot). Typically, three types of color filters for the three primary colors of light (i.e., red (R), green (G) and blue (B)) are arranged in a predetermined pattern for respective picture elements. In this case, a set of three picture elements (dots) provided with the R, G and B color filters form a single pixel, which can be the smallest unit to conduct a color display operation.

However, the colors of color filters (or picture elements) to be used as a single set do not have to be R, G and B but may also be a combination of cyan (C), magenta (M) and yellow (Y) or a set of any other suitable colors. Also, as is well known in the art, a striped arrangement, a delta arrangement or a mosaic arrangement may be adopted for those color filters.

In an LCD, a liquid crystal layer is usually provided between two substrates, one of which includes a color filter layer where a plurality of color filters are arranged for respective picture elements. For example, in a TFT LCD, a liquid crystal layer is located between a TFT substrate on which picture element electrodes, TFTs and other circuit components are arranged and a counter substrate including a counter electrode and a color filter layer thereon. An LCD including a color filter layer on a TFT substrate is also known. However, most of LCDs currently on the market include a color filter layer on the counter substrate. That is why such a counter substrate with a color filter layer is often called a "color filter substrate".

To control the thickness of a liquid crystal layer (which is also called a "cell gap") in bonding a color filter substrate and a TFT substrate together, spacers are provided. However, as the display quality of LCDs has been more and more improved, deterioration in display quality due to the presence of those spacers has become an issue more and more often.

Specifically, in the prior art, bead-like or rod-like spacers with a predetermined diameter are scattered on the surface of a color filter substrate or a TFT substrate. Thus, it is difficult to arrange those spacers at a uniform density over the entire display plane. As a result, the cell gap may vary significantly from one position to another or the spacers may collect together locally, thus sometimes causing defects in display. Also, when those spacers are arranged within a picture element, the aperture ratio of the LCD may decrease substantially or those spacers may be sensed as bright spots to the viewer's eyes.

In view of these considerations, a method of selectively arranging the spacers in a predetermined area outside of each picture element (which is typically an area shielded from external light with a black matrix) was developed. For example, a method of forming columnar spacers in such a predetermined area by a photolithographic process using a photosensitive resin (which is often called a "photoresist") has been used actually.

The deterioration in display quality as mentioned above can be minimized by controlling the cell gap with columnar spacers. However, to further improve the display quality, various methods of arranging or forming those columnar spacers have been proposed.

For instance, Japanese Patent Application Laid-Open Publication No. 2003-84289 discloses the techniques of minimizing production of bubbles in a liquid crystal layer at a low temperature and increasing the withstand load thereof by providing two types of columnar spacers of mutually different heights on a color filter substrate.

FIGS. 24A and 24B illustrate a color filter substrate 70 disclosed in Japanese Patent Application Laid-Open Publication No. 2003-84289. As shown in FIG. 24A, this color filter substrate 70 includes columnar spacers 76 and 77, which are provided outside of picture elements. In the area outside of the picture elements on the color filter substrate 70, a black matrix 72, color filters 73, 74, and a common electrode 75 are stacked one upon the other in this order on a transparent substrate 71 and the columnar spacers 76 and 77 are provided thereon as shown in FIG. 24B.

The color filter 73 and its adjacent color filter 74 have mutually different thicknesses, and therefore, the columnar spacers 76 and 77 provided on the color filters 73 and 74, respectively, also have different heights.

Generally speaking, in an LCD using columnar spacers, if the density of columnar spacers (i.e., the number of columnar spacers provided per unit area) is increased to improve the withstand load thereof, then it becomes more and more difficult for the cell gap to catch up with the shrinkage of a liquid crystal layer at a low temperature. As a result, bubbles are produced in the liquid crystal layer (which phenomenon will be referred to herein as "low-temperature bubbling").

If the two types of columnar spacers 76 and 77 with different heights are provided such that the cell gap is controllable with only the higher columnar spacer 76 in most cases as disclosed in Japanese Patent Application Laid-Open Publication No. 2003-84289, then the effective spacer density is defined by only the higher columnar spacers 76. In that case, the cell gap can catch up with the shrinkage of the liquid crystal layer more easily. Also, when the cell gap decreases upon the application of load to the liquid crystal panel, the two substrates are supported by both the higher and lower columnar spacers 76 and 77 alike (and the effective spacer density is defined by both of the two types of columnar spacers 76 and 77 in that case). Consequently, high withstand load is realized.

Furthermore, to realize an even more uniform cell gap, the columnar spacers are preferably provided in not just the display area but also a non-display area surrounding the display area. However, different structures are defined in the display area and non-display area. Thus, it is difficult to control the heights of the columnar spacers to their best value(s) (e.g., equalize their heights with each other) in both the display area and non-display area.

Japanese Patent Application Laid-Open Publication No. 2001-51266 discloses the technique of providing a multilayer structure of a black matrix and color filters in a non-display area and providing columnar spacers on the multilayer structure. According to this technique, by adjusting the number of layers included in the multilayer structure, the height of the columnar spacers provided in the non-display area can be controlled. Thus, the columnar spacers can have their height controlled differently in the display area and in the non-display area.

However, if the color filters 73 and 74 of mutually different thicknesses were used as disclosed in Japanese Patent Application Laid-Open Publication No. 2003-84289, then the thickness of the liquid crystal layer in some picture elements would be different from that of the liquid crystal layer in other picture elements. In that case, the magnitude of retardation caused by the liquid crystal layer on light would be different in these groups of picture elements. As a result, unwanted coloring would be produced and the display quality would decrease in a black display or in a grayscale display.

On the other hand, according to the technique disclosed in Japanese Patent Application Laid-Open Publication No. 2001-51266, the heights of the columnar spacers are controlled by changing the number of layers included in the multilayer structure. However, this technique just allows the designer to change the heights of the columnar spacers by no less than the thickness of each of the layers included in the multilayer structure. Thus, the heights of the columnar spacers can be changed only discontinuously.

In sum, a sufficiently effective technique of controlling the heights of columnar spacers arbitrarily by a simple process has not been established yet.

SUMMARY OF THE INVENTION

In order to overcome the problems described above, embodiments of the present invention provide a color filter substrate in which the heights of columnar spacers can be controlled by a simple manufacturing process, a method of making such a color filter substrate, and a display device including such a color filter substrate.

A color filter substrate according to an embodiment of the present invention preferably includes: a base substrate; a light-shield layer and a color filter layer provided on the base substrate; a plurality of columnar spacers, which are made of a resin and provided so as to stick out of the base substrate; and an undercoat layer, which is provided between the columnar spacers and the base substrate. The color filter layer preferably includes a first type of color filter, a second type of color filter and a third type of color filter, which transmit light rays in mutually different colors. The undercoat layer is preferably made of the same film as one of the first, second and third types of color filters and the light-shield layer. A portion of the undercoat layer, associated with a first one of the columnar spacers, preferably has a different area and/or shape from another portion of the undercoat layer, associated with a second one of the columnar spacers. The first and second columnar spacers preferably have mutually different heights.

In one embodiment of the present invention, the portion of the undercoat layer associated with the first columnar spacer preferably has a greater area than the portion of the undercoat layer associated with the second columnar spacer, and the height of the first columnar spacer is preferably greater than that of the second columnar spacer.

In another embodiment, the heights $h1$ and $h2$ (μm) of the first and second columnar spacers, the shortest distance $X1$ (μm) from the center of mass of the first columnar spacer to the outer edge of its associated portion of the undercoat layer, and the shortest distance $X2$ (μm) from the center of mass of the second columnar spacer to the outer edge of its associated portion of the undercoat layer preferably satisfy the inequality: $0.008 \leq (h1-h2)/2(X1-X2) \leq 0.06$, where the distances $X1$ and $X2$ are measured when the color filter substrate is viewed perpendicularly to the principal surface of the base substrate.

A display device according to an embodiment of the present invention preferably includes: the color filter substrate according to any of the embodiments of the present invention described above; an active-matrix substrate provided so as to face the color filter substrate; and a display medium layer interposed between the color filter substrate and the active-matrix substrate.

In one embodiment of the present invention, the active-matrix substrate preferably includes a plurality of switching elements, which are arranged in matrix, and respective portions of the undercoat layer of the color filter substrate preferably face associated ones of the switching elements.

A display device according to another embodiment of the present invention preferably includes: an active-matrix substrate including a plurality of switching elements that are arranged in matrix; a color filter substrate arranged so as to face the active-matrix substrate; and a display medium layer interposed between the active-matrix substrate and the color filter substrate. The color filter substrate preferably includes: a transparent substrate; a light-shield layer and a color filter layer provided on the transparent substrate; and a plurality of columnar spacers, which are made of a resin and provided to define a gap between the active-matrix substrate and the color filter substrate. The light-shield layer preferably includes switching element shielding portions to shield the switching elements from light. And the columnar spacers are preferably arranged so as to overlap with the switching element shielding portions.

In one embodiment of the present invention, the active-matrix substrate preferably includes picture element electrodes, which are electrically connected to the switching elements, and the columnar spacers are preferably arranged so as not to overlap with the picture element electrodes.

In another embodiment, the active-matrix substrate preferably includes a plurality of gate lines extending in a first direction and a plurality of source lines extending in a direction that is not parallel to the first direction so as to make intersections with the gate lines. The columnar spacers are preferably arranged so as not to overlap with any of the intersections between the gate lines and the source lines.

In still another embodiment, the display medium layer is preferably a liquid crystal layer.

A method of making a color filter substrate according to an embodiment of the present invention is preferably designed to make a color filter substrate including: a base substrate; a light-shield layer and a color filter layer provided on the base substrate; a plurality of columnar spacers, which are made of a resin and provided so as to stick out of the base substrate; and an undercoat layer, which is provided between the columnar spacers and the base substrate. The color filter layer preferably includes a first type of color filter, a second type of color filter and a third type of color filter, which transmit light rays in mutually different colors. The method preferably includes the steps of: (a) forming the light-shield layer and the color filter layer on the base substrate; and (b) making the columnar spacers of the resin on the base substrate on which the light-shield layer and the color filter layer have been provided. The step (a) preferably includes the step (a1) of making the undercoat layer of the same film as one of the first, second and third types of color filters and the light-shield layer. The step (b) preferably includes controlling the heights of the columnar spacers by adjusting the areas and/or shapes of their associated portions of the undercoat layer in the step (a1).

In one embodiment of the present invention, the step (b) preferably includes making the columnar spacers have a predetermined height that is correlated to the areas and/or shapes of their associated portions of the undercoat layer.

In this particular embodiment, the step of making the columnar spacers have a predetermined height preferably includes correlating the height h ($\mu$m) of each said columnar spacer to the shortest distance X ($\mu$m) from the center of mass of the columnar spacer to the outer edge of its associated portion of the undercoat layer as viewed perpendicularly to the principal surface of the base substrate such that the height h and the distance X1 satisfy: h==a+b·2X and $0.008 \leq b \leq 0.06$, where a is a prescribed constant.

In another embodiment, the step (a1) preferably includes forming the undercoat layer such that a portion of the undercoat layer, associated with a first one of the columnar spacers, and another portion of the undercoat layer, associated with a second one of the columnar spacers, have mutually different areas or shapes, thereby making the first and second columnar spacers at mutually different heights in the step (b).

In a specific embodiment, the step (a1) preferably includes forming the undercoat layer such that the portion of the undercoat layer associated with the first columnar spacer has a greater area than the portion of the undercoat layer associated with the second columnar spacer, thereby making the first columnar spacer higher than the second columnar spacer in the step (b).

In still another embodiment, the color filter substrate preferably includes at least one additional undercoat layer between the columnar spacers and the undercoat layer. The step (a) preferably includes the step (a2) of making the additional undercoat layer of a film that is the same as at least one of the first, second and third types of color filters and the light-shield layer but that is different from the undercoat layer. The step (b) preferably includes controlling the heights of the columnar spacers by adjusting the areas and/or shapes of their associated portions of the undercoat layer in the step (a1) and the areas and/or shapes of their associated portions of the additional undercoat layer in the step (a2), respectively.

In yet another embodiment, the step (a1) preferably includes making the undercoat layer and the light-shield layer of the same film.

In yet another embodiment, the step (a1) preferably includes making the undercoat layer and one of the first, second and third types of color filters of the same film.

In yet another embodiment, the method preferably further includes the step (c) of making an electrode of a trans-parent conductive material on the base substrate on which the light-shield layer and the color filter layers have been provided before the step (b) is carried out.

In this particular embodiment, the step (b) preferably includes making not only the columnar spacers but also protrusions, lower in height than the columnar spacers, on the electrode of the same resin simultaneously.

In yet another embodiment, the step (a) preferably includes making the light-shield layer and the first, second and third types of color filters of a photosensitive resin.

A method of making a color filter substrate according to another embodiment of the present invention is preferably designed to make a color filter substrate including: a base substrate; a light-shield layer and a color filter layer provided on the base substrate; a plurality of columnar spacers, which are made of a resin and provided so as to stick out of the base substrate; and an undercoat layer, which is provided between the columnar spacers and the base substrate. The color filter layer preferably includes a first type of color filter, a second type of color filter and a third type of color filter, which transmit light rays in mutually different colors. The method preferably includes the steps of: (A) preparing a mother substrate that has a plurality of regions to be cut into the base substrates; (B) forming the light-shield layer and the color filter layer on the regions of the mother substrate; and (C) making the columnar spacers of the resin on the regions on which the light-shield layer and the color filter layer have been provided. The step (B) preferably includes the step (B1) of making the undercoat layer of the same film as one of the first, second and third types of color filters and the light-shield layer. The step (C) preferably includes controlling the heights of the columnar spacers on a region-by-region basis by adjusting the area and/or shape of the undercoat layer in one of the regions after another in the step (B1).

In one embodiment of the present invention, the step (C) preferably includes having the columnar spacers have a predetermined height that is correlated to the areas and/or shapes of their associated portions of the undercoat layer on the region-by-region basis.

In another embodiment, the step (B1) preferably includes forming the undercoat layer such that a portion of the undercoat layer, provided on a first one of the regions, and another portion of the undercoat layer, provided on a second one of the regions, have mutually different areas or shapes, thereby making the height of the columnar spacers in the first region different from that of the columnar spacers in the second region in the step (C).

In a specific embodiment, the step (B1) preferably includes forming the undercoat layer such that the portion of the undercoat layer provided in the first region has a greater area than the portion of the undercoat layer provided in the second region, thereby making the columnar spacers in the first region higher than the columnar spacers in the second region in the step (C).

A method of making a color filter substrate according to still another embodiment of the present invention is preferably designed to make a color filter substrate including: a base substrate; a light-shield layer and a color filter layer provided on the base substrate; and a plurality of multilayer structures, each of which is provided so as to stick out of the color filter layer on the base substrate and includes at least two resin layers. The color filter layer preferably includes a first type of color filter, a second type of color filter and a third type of color filter, which transmit light rays in mutually different colors. The method preferably includes the step ($\alpha$) of forming the light-shield layer and the color filter layer on the base substrate. The step ($\alpha$) preferably includes the step ($\beta$) of forming the multilayer structures by making the at least two resin layers of the same films as at least two of the first, second, and third types of color filters and the light-shield layer. The step ($\beta$) preferably includes the step of controlling the heights of the multilayer structures by adjusting the areas and/or shapes of their associated portions of at least one of the at least two resin layers.

A color filter substrate according to yet another embodiment of the present invention is preferably made by the method according to any of the preferred embodiments of the present invention described above.

In a method of making a color filter substrate according to an embodiment of the present invention, the height of a columnar spacer is controlled by adjusting the area and/or shape of its associated portion of an undercoat layer, which is located between the columnar spacer and the base substrate.

Thus, the height of the columnar spacer can be controlled to any arbitrary value according to the area and/or shape of its associated portion of the undercoat layer. The undercoat layer is made of the same film as a light-shield layer or a color filter provided on the base substrate. That is why the method of the present invention can be carried out as a simple manufacturing process without performing any additional process step of forming the undercoat layer.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIGS. 24A and 24B are respectively a plan view and a cross-sectional view schematically illustrating a conventional color filter substrate 70.

DETAILED DESCRIPTION OF THE INVENTION

Figure 1:
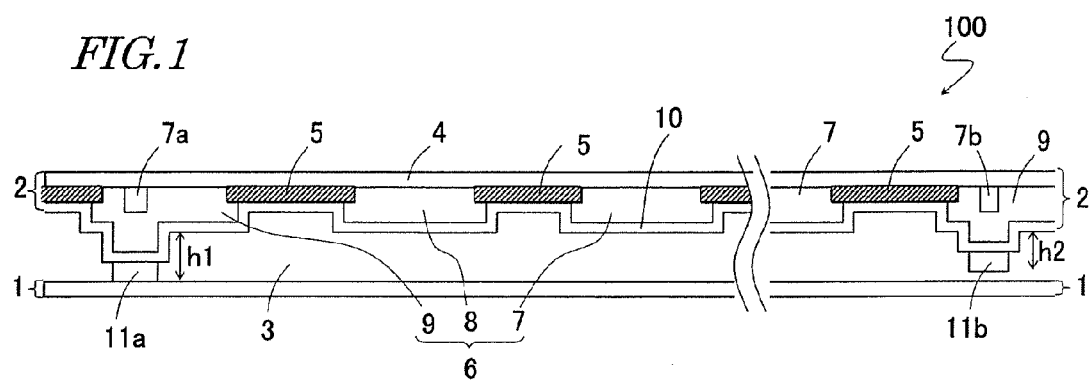
FIG. 1 is a cross-sectional view schematically illustrating an LCD 100 according to a first specific embodiment of the present invention.

The inventors of the present invention discovered that if an undercoat layer is provided between a columnar spacer and a base substrate and has its area and/or shape changed, then the heights of the columnar spacers to be provided on the undercoat layer can be changed continuously, thus acquiring the basic idea of the present invention.

In a method of making a color filter substrate according to an embodiment of the present invention, the height of a columnar spacer is controlled by adjusting the area and/or shape of its associated portion of the undercoat layer provided between the columnar spacer and the base substrate. Thus, the height of the columnar spacer can be controlled to any arbitrary value according to the area and/or shape of its associated portion of the undercoat layer. That is to say, the height of the columnar spacer can be controlled to draw an "analog" curve, so to speak. The undercoat layer is made of the same film as a light-shield layer or a color filter provided on the base substrate. That is why the method of the present invention can be carried out as a simple manufacturing process without performing any additional process step of forming the undercoat layer.

In addition, a number of columnar spacers are supposed to be arranged on a single color filter substrate. Thus, by controlling the areas and/or shapes of respective portions of the undercoat layer that are associated with those columnar spacers, columnar spacers of multiple different heights can be arranged on the same color filter substrate.

Furthermore, the columnar spacers are typically arranged on a substrate that includes a plurality of regions to be cut into base substrates. If the base substrates are glass substrates, such a substrate is called "mother glass". Thus, such a substrate will be referred to herein as a "mother substrate". Accordingly, by controlling the area and/or shape of each portion of the undercoat layer for every base substrate (i.e., on a region-by-region basis), the heights of the columnar spacers can be changed from one region to another. Consequently, even if a single mother substrate needs to be divided into base substrates of multiple different sizes, the heights of columnar spacers can be easily adapted to the respective base substrates.

Hereinafter, embodiments of the present invention will be described with reference to the accompanying drawings. In the following description, embodiments of the present invention are implemented as a color filter substrate for use in an active-matrix-addressed LCD and a method of making such a color filter substrate. However, the present invention is in no way limited to those specific embodiments.

Embodiment 1

First, the structure of an LCD 100 according to a first specific embodiment of the present invention will be described with reference to FIG. 1, which is a cross-sectional view schematically illustrating the LCD 100.

The LCD 100 preferably includes an active-matrix substrate 1, a color filter substrate 2 facing the active-matrix substrate 1, and a liquid crystal layer 3 interposed between the two substrates 1 and 2. The active-matrix substrate 1 may be the same as that of a known LCD, and the description of its structure will be omitted herein.

The color filter substrate 2 preferably includes a transparent substrate 4, a light-shield layer (an opaque layer) 5 and a color filter layer 6 provided on the substrate 4, and a plurality of columnar spacers 11a, 11b, which are provided so as to stick out of the substrate 4.

The light-shield layer 5 is preferably provided in a matrix (or striped) pattern in the areas outside of picture elements and is sometimes called a "black matrix (BM)". The color filter layer 6 preferably includes a first type of color filter 7, a second type of color filter 8 and a third type of color filter 9, which transmit light rays in mutually different colors. The first, second and third types of color filters 7, 8 and 9 may be red (R), green (G) and blue (B) color filters, respectively. A common electrode 10 made of a transparent conductive material (such as ITO) is preferably provided so as to cover the light-shield layer 5 and color filter layer 6.

The columnar spacers 11a, 11b are preferably provided on the common electrode 10 and made of a resin. In this embodiment, the columnar spacers 11a, 11b are preferably made of a photosensitive resin (which is also called a "photoresist"). An undercoat layer 7a, 7b is preferably provided between the columnar spacers 11a, 11b and the substrate 4. That is to say, the columnar spacer 11a is preferably located over a portion 7a of the undercoat layer with the third type of color filter 9 and the common electrode 10 interposed between them. On the other hand, the columnar spacer 11b is preferably located over a portion 7b of the undercoat layer with the third type of color filter 9 and the common electrode 10 interposed between them.

The undercoat layer 7a, 7b and the first type of color filter 7 are preferably made of the same film. Specifically, in the embodiment illustrated in FIG. 1, the two portions 7a and 7b of the undercoat layer located on the left- and right-hand sides are preferably provided so as to have mutually different areas as viewed perpendicularly to the principal surface of the substrate 4. That is to say, the area of the left-hand-side portion 7a of the undercoat layer is preferably greater than that of the right-hand-side portion 7b thereof.

The columnar spacers 11a and 11b located over these portions 7a and 7b of the undercoat layer preferably have mutually different heights h1 and h2. Specifically, the height h1 of the columnar spacer 11a located over the portion 7a with the greater area exceeds the height h2 of the columnar spacer 11b located over the portion 7b with the smaller area. It should be noted that the "height" of the columnar spacer 11a, 11b does not refer to the thickness of the columnar spacer 11a, 11b itself (i.e., the distance between the top and bottom of each columnar spacer 11a, 11b) but means a distance from a reference plane to the top of the columnar spacer 11a, 11b. In this description, if the height of the columnar spacer 11a, 11b needs to be shown specifically, then the height refers to the distance from a reference plane, which is defined by the surface of the common electrode 10 (except the portions over the undercoat layer) to the top of the columnar spacer 11a, 11b.

As shown in FIG. 1, the higher columnar spacer 11a is in contact with the active-matrix substrate 1, whereas the lower columnar spacer 11b is out of contact with the active-matrix substrate 1. That is to say, in this state, the cell gap is defined by only the higher columnar spacer 1a.

Figure 2:
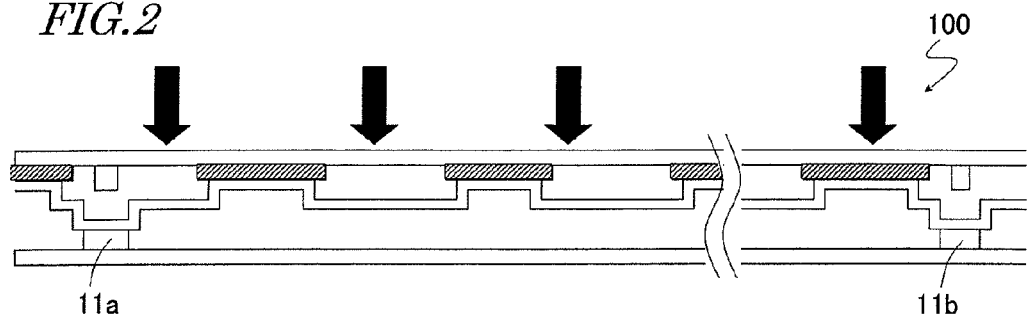
FIG. 2 is a cross-sectional view schematically illustrating how the LCD 100 deforms on receiving load.

In the conventional LCD, if the density of columnar spacers (i.e., the number of columnar spacers per unit area) is increased to improve the withstand load, then low-temperature bubbling is produced more easily as described above. In contrast, in the LCD 100 of this embodiment, the cell gap is basically controlled by only the higher columnar spacer 11a as shown in FIG. 1. Thus, the effective spacer density is defined by only the higher columnar spacers 11a. As a result, the cell gap can easily catch up with the shrinkage of the liquid crystal layer and the production of low-temperature bubbles can be minimized. Also, when the cell gap decreases upon the application of load to the LCD 100, the two substrates are supported by both the higher and lower columnar spacers 11a and 11b alike as shown in FIG. 2. In that case, the effective spacer density is defined by both of the two types of columnar spacers 11a and 11b. Consequently, high withstand load is realized.

Hereinafter, a method for fabricating the LCD 100 will be described. The active-matrix substrate 1 can be made by the known method. That is why a method of making the color filter substrate 2 will be described in detail with reference to FIGS. 3A through 3F.

As shown in FIGS. 3A through 3D, a light-shield layer and a color filter layer 6 are preferably formed on a transparent substrate (e.g., glass substrate) 4. In this example, the light-shield layer 5 and the color filter layer 6 are supposed to be made of a dry film. A dry film is a photosensitive resin film, which is normally sandwiched between two film supporting members of polyethylene terephthalate (PET), for example. In the photosensitive resin film, pigments in predetermined colors (e.g., red, green, blue and black) are dispersed. And the photosensitive resin film used as a dry film to make the light-shield layer 5 and the color filter layer 6 is typically negative.

Figure 3A:
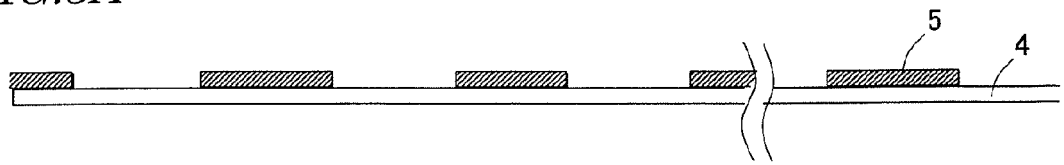
FIGS. 3A through 3F are cross-sectional views schematically illustrating the process steps of making the color filter substrate 2 of the LCD 100.

First, a light-shield layer 5 is formed on the substrate 4 as shown in FIG. 3A. Specifically, first, a black dry film is attached onto, and rolled on, the substrate 4 and then its film supporting members are peeled off, thereby transferring a black photosensitive resin film onto the substrate 4. This process step is normally carried out with the dry film heated, i.e., a so-called "thermal transfer process". Next, the black photosensitive resin film thus transferred is exposed to radiation through a mask and then developed, thereby forming the light-shield layer 5.

Figure 3B:
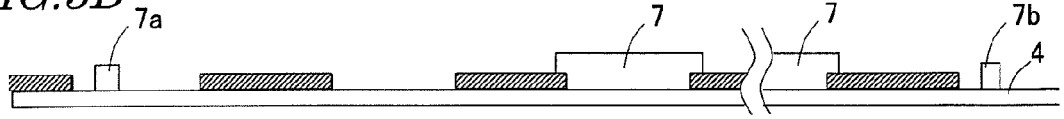

Next, as shown in FIG. 3B, first type of color filters 7 and an undercoat layer 7a, 7b are preferably formed simultaneously. More specifically, as in the process step of forming the light-shield layer 5, a dry film to make the first type of color filter 7 is attached onto, and rolled on, the substrate 4 and then its film supporting members are peeled off, thereby transferring a photosensitive resin film onto the substrate 4. Next, the photosensitive resin film thus transferred is exposed to radiation through a mask and then developed, thereby forming the first type of color filter 7 and the undercoat layer 7a, 7b. In this process step, the portion 7a of the undercoat layer is formed so as to have a greater area than the portion 7b of the undercoat layer. These portions 7a and 7b of the undercoat layer are preferably positioned so as to face the opaque portions (e.g., metal interconnects) of the active-matrix substrate 1 when the color filter substrate and active-matrix substrate 1 are bonded together.

Figure 3C:
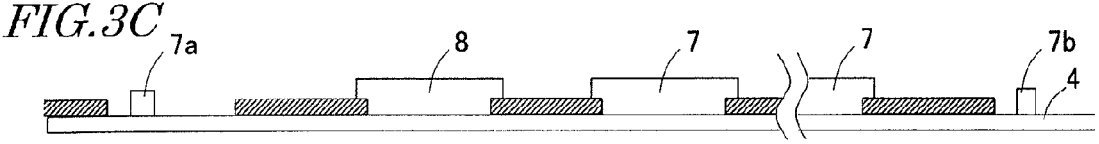

Subsequently, as shown in FIG. 3C, second type of color filters 8 are preferably formed. The second type of color filter 8 may be made of its dedicated dry film as in the previous process step of forming the first type of color filter 7.

Figure 3D:
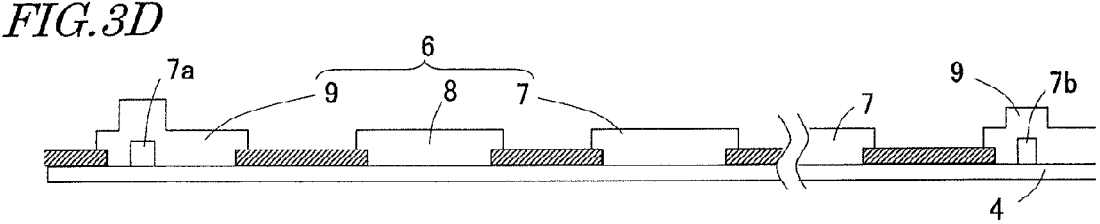

Thereafter, as shown in FIG. 3D, third type of color filters 9 are preferably formed. The third type of color filters 9 are provided so as to cover the portions 7a and 7b of the undercoat layer. Thus, the third type of color filters 9 are partially raised where the color filters 9 overlap the portions 7a and 7b of the undercoat layer. The third type of color filters 9 may be made of their dedicated dry film as in the process step of forming the first type of color filter 7.

Figure 3E:
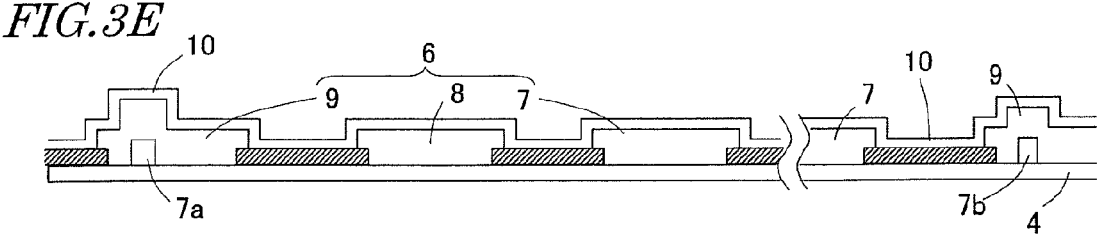

Subsequently, as shown in FIG. 3E, a common electrode 10 is preferably formed. The common electrode 10 may be made of a transparent conductive material such as ITO and may be deposited by a sputtering process, for example.

Figure 3F:
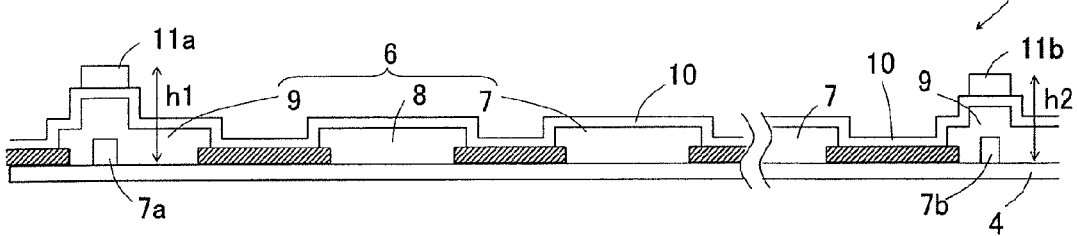

Thereafter, as shown in FIG. 3F, columnar spacers 11a and 11b are preferably formed on the substrate 4 on which the light-shield layer 5, color filter layer 6 and common electrode 10 have already been provided, thereby completing the color filter substrate 2. The columnar spacers 11a and 11b may be formed by attaching a dry film to be columnar spacers onto the common electrode 10, exposing the dry film to radiation through a mask and then developing the dry film such that the photosensitive resin is removed entirely except over the portions 7a and 7b of the undercoat layer. The photosensitive resin as the material of the dry film to make the columnar spacers 11a and 11b may be positive or negative.

Then, the color filter substrate 2 obtained in this manner and an active-matrix substrate 1 separately prepared are preferably bonded together with a seal member applied to the outside of the display area on one of these two substrates 1 and 2. Before this process step is carried out, an alignment film is preferably deposited on the surface of the color filter substrate 2 and active-matrix substrate 1. Finally, a liquid crystal material is preferably injected into the gap between the two substrates and the hole is closed airtight, thereby completing an LCD 100. Optionally, a liquid crystal layer may be formed by subjecting the substrate with the seal member to a dropping process and then the two substrates may be bonded together.

If the color filter substrate 2 is made by this process, the columnar spacers 11a and 11b are made of the same material and formed in the same process step but have mutually different heights. That is to say, the height h1 of the columnar spacer 11a provided over the portion 7a of the undercoat layer with the greater area exceeds the height h2 of the columnar spacer 11b provided over the portion 7b with the smaller area.

Hereinafter, the correlation between the heights of the columnar spacers 11a, 11b and the areas of these portions 7a, 7b of the undercoat layer will be described.

Figure 4:
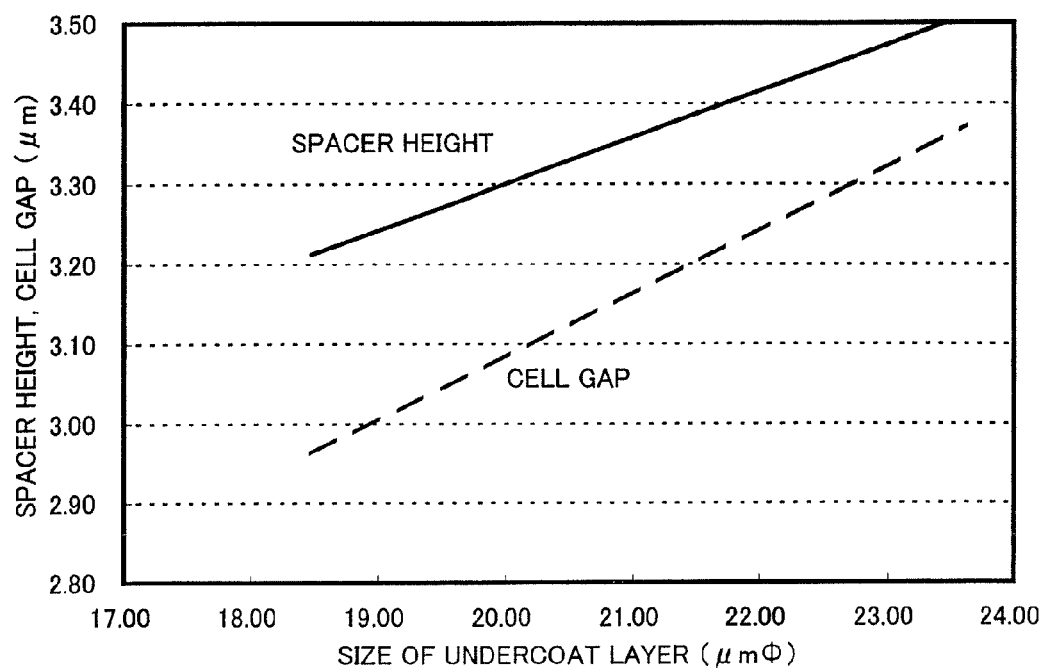
FIG. 4 is a graph showing how the height ($\mu m$) of a columnar spacer and the cell gap ($\mu m$) change with the size ($\mu m\phi$) of the undercoat layer.

The inventors of the present invention measured the heights of a columnar spacer with the area of its associated portion of the undercoat layer changed on the color filter substrate 2 made by the method described above. The results are shown in FIG. 4. In FIG. 4, the abscissa does not represent the area of the undercoat layer itself but a twodimensional size (μmφ) of a substantially circular undercoat layer, while the ordinate represents the height (μm) of the columnar spacer and the cell gap (μm). As the material of the light-shield layer, respective types of color filters and columnar spacers, a transer type dry film produced by Fuji Photo Film Co., Ltd. was used. More specifically, a dry film including a negative photoresist was used to make the light-shield layer and the respective types of color filters, while a dry film including a positive photoresist was used to make the columnar spacers. The thicknesses of the respective types of color filters were adjusted to around 2.0 μm, while that of the columnar spacers was adjusted to around 1.4 μm. The size of the undercoat layer was changed within the range of 18.0 μmφ to 24.0 μmφ (which is represented by a designed value for a photomask). The other manufacturing conditions are shown in the following Table 1:

TABLE 1

|  | Light-shield layer | Color filter layer | Columnar spacer |
| --- | --- | --- | --- |
| Substrate Used | Glass substrate with a thickness of 0.7 mm | | |
| Laminate | 120° C. | 120° C. | 120° C. |
| Exposure | 100 mJ | 60 mJ | 100 mJ |
| Development | 1.5% Na$_2$CO$_3$/NaHCO$_3$ | 1.5% Na$_2$CO$_3$/NaHCO$_3$ | 2.3% TMAH |
| Baking | 230° C. × 60 min | 230° C. × 60 min | 230° C. × 30 min |

As can be seen from FIG. 4, there is a close correlation between the height of the columnar spacer and the twodimensional size of the undercoat layer. It can also be seen that the correlation between the height of the columnar spacer and the size of the undercoat layer has linearity. That is to say, the greater the size of the undercoat layer (i.e., the larger the area of the undercoat layer), the higher the columnar spacer. The same statement applies to the cell gap, too. Thus, it can also be seen that the cell gap increases as the area of the undercoat layer increases.

Hereinafter, it will be described why the height of the columnar spacer increases as the area of its associated portion of the undercoat layer increases.

Figure 5A:
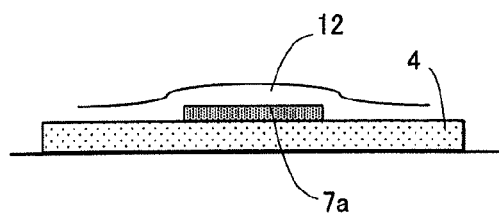
FIGS. 5A and 5B show how the area of an undercoat layer affects a decrease in the thickness of a layer that is located right on the undercoat layer.
Figure 5B:
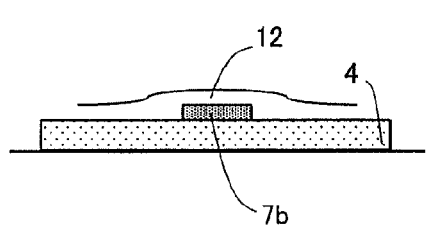

When a material to make the next layer is deposited on a substrate on which the undercoat layer has already been formed, the material is going to flow due to its own weight, and the thickness of the film being deposited on the undercoat layer decreases to a certain degree. However, such a decrease in the thickness of the film being deposited is affected by the surface tension applied on the material. The more significantly the decrease in film thickness is affected by the surface tension, the less the decrease in film thickness. The material deposited on the undercoat layer 7a with a relatively large area as shown in FIG. 5A is affected by the surface tension more significantly than the material deposited on the undercoat layer 7b with a relatively small area as shown in FIG. 5B. Thus, the former material causes a smaller decrease in film thickness than the latter material does. Consequently, the layer 12 of the material deposited on such an undercoat layer 7a with the larger area becomes thicker than the layer 12 of the material deposited on the undercoat layer 7b with the smaller area.

Figure 6A:
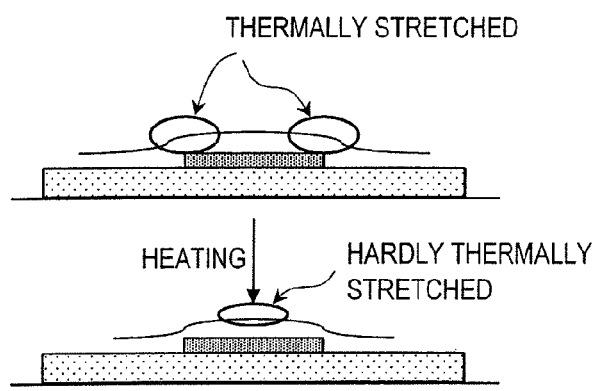
FIGS. 6A and 6B show how the area of an undercoat layer affects a decrease in the thickness of a layer that is located right on the undercoat layer.
Figure 6B:
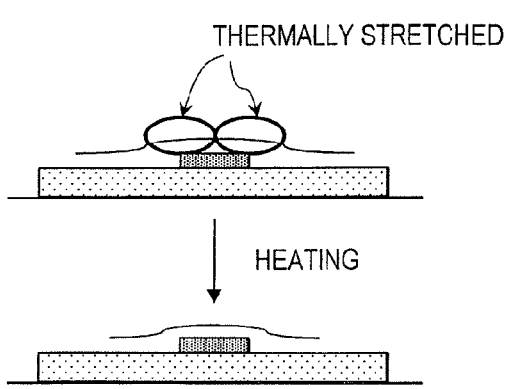

Also, when the material deposited on an undercoat layer (e.g., a photosensitive resin included in a dry film) is subjected to a heat treatment, the thickness of the film deposited also decreases due to thermal stretching mostly around the outer edge of the undercoat layer. If the undercoat layer 7a has a relatively large area as shown in FIG. 6A, then the percentage of the portion that is not affected by the thermal stretching so much (i.e., the portion around the center of the undercoat layer 7a) is greater than that of the undercoat layer 7b with a relatively small area as shown in FIG. 6B. Thus, the thickness of the film deposited on the undercoat layer 7a does not decrease due to the thermal stretching so much as that of the film deposited on the undercoat layer 7b. Consequently, the layer 12 of the material deposited on such an undercoat layer 7a with the larger area becomes thicker than the layer 12 of the material deposited on the undercoat layer 7b with the smaller area.

That is why the greater the area of an undercoat layer, the thicker the layer deposited right on that undercoat layer becomes. As a result, the columnar spacer can have an increased height. In the example just described, the area of the undercoat layer is supposed to be changed. However, the ratio of the significantly thermally stretched portion to the hardly thermally stretched portion and the effects of the surface tension on the material also change when the shape of the undercoat layer is changed. For that reason, even by changing the shape of the undercoat layer, the height of the columnar spacer can also be controlled. Consequently, the height of the columnar spacer can be controlled by changing the area and/or shape of the undercoat layer.

As described above, in a method of making a color filter substrate according to an embodiment of the present invention, the height of a columnar spacer (more exactly, the distance from a reference plane to the top of that columnar spacer) is controlled by adjusting the area and/or shape of its associated portion of the undercoat layer. Thus, the height of the columnar spacer can be controlled to any arbitrary value according to the area and/or shape of its associated portion of the undercoat layer. That is to say, the height of the columnar spacer can be controlled to draw an "analog" curve, so to speak. The undercoat layer is made of the same film as a light-shield layer or a color filter provided on the base substrate. That is why the method of the present invention can be carried out as a simple manufacturing process without performing any additional process step of forming the undercoat layer.

As described above, the "height" of the columnar spacer 11a, 11b does not refer to the thickness of the columnar spacer 11a, 11b itself (i.e., the distance between the top and bottom of each columnar spacer 11a, 11b) but means a distance from a reference plane to the top of the columnar spacer 11a, 11b. Therefore, "to control the height of a columnar spacer" does not mean "to control the thickness of a photosensitive resin layer provided as the columnar spacer". Accordingly, if an additional layer (more specifically, a third type of color filter 9 in the example illustrated in FIG. 1) is present between the undercoat layer and the columnar spacer as in this embodiment, then "to control the height of the columnar spacer" means to control the thickness of the additional layer on the undercoat layer and that of the columnar spacer on the additional layer (i.e., to control the overall thickness of the multilayer structure consisting of the additional layer and the columnar spacer) by adjusting the area and/or shape of the undercoat layer.

As shown in FIG. 4, the height of a columnar spacer is closely correlated to the area and/or shape of its associated portion of the undercoat layer. Accordingly, the area and/or shape of any portion of the undercoat layer may be defined according to the desired height of its associated columnar spacer. For example, suppose the size of the undercoat layer and the height of the columnar spacer have a correlation such as that shown in FIG. 4. In that case, to set the heights of the higher and lower columnar spacers 11a and 11b to 3.45 µm and 3.2 µm, respectively, the portion 7a of the undercoat layer associated with the higher columnar spacer 11a may have a size of 23.0 µmϕ, while the portion 7b of the undercoat layer associated with the lower columnar spacer 11b may have a size of 18.5 µmϕ.

In this case, the heights and elasticity of the columnar spacers 11a and 11b are preferably defined such that the variation in cell gap becomes smaller than the level difference between these columnar spacers 11a and 11b when the temperature decreases from room temperature (e.g., 23° C.) to a low temperature (e.g., −20° C.). By adopting such setting, while no load is being applied to the LCD 100, the cell gap is defined by only the higher columnar spacers 11a. That is why by adjusting the density of the higher columnar spacers 11a, the cell gap can catch up with the shrinkage of the liquid crystal layer and the production of low-temperature bubbles can be minimized. Also, when the cell gap decreases due to the pressure applied by user's fingers on the LCD 100, the two substrates are supported by both the higher and lower columnar spacers 11a and 11b alike as shown in FIG. 2. As a result, high withstand load is realized.

To make the cell gap catch up with the shrinkage of the liquid crystal layer and to achieve sufficiently high resistance even when load is applied to the LCD, the higher columnar spacers 11a preferably have a density of about 0.015% and the lower columnar spacers 11b preferably have a density of about 0.02%. In this case, the density of the columnar spacers is defined as (the total area of the smallest one of the columnar spacer and the portion of the undercoat layer associated with the columnar spacer/the area of the color filter substrate)×100 (%).

In the graph shown in FIG. 4, the correlation between the size of the undercoat layer and the height of the columnar spacers has linearity. However, once the size of the undercoat layer exceeds a certain value, this linearity disappears. For example, according to the data shown in FIG. 4, once the size of the undercoat layer exceeds 24 µmϕ, the height of the columnar spacer becomes substantially constant. For that reason, the height of the columnar spacers is preferably controlled within the range where the size of the undercoat layer and the height of the columnar spacer still have linear correlation. The columnar spacers typically have a height of 2.5 µm to 5.0 µm.

In the embodiment described above, columnar spacers 11a and 11b with mutually different heights are provided to minimize the low-temperature bubbling and to improve the withstand load at the same time. However, in a method of making a color filter substrate according to an embodiment of the present invention, the heights of columnar spacers can be controlled on an individual basis and therefore, other advantages are achievable as well. For example, there are a number of level differences on the surface of the active-matrix substrate that faces the color filter substrate. Thus, by appropriately changing the heights of columnar spacers according to the magnitudes of those level differences, the cell gap can be made even more uniform.

Embodiment 2

Figure 7A:
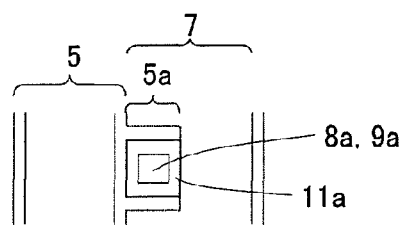
FIG. 7A is a plan view schematically illustrating a columnar spacer and its surrounding portions in an LCD 200 according to a second specific embodiment of the present invention.
Figure 7B:
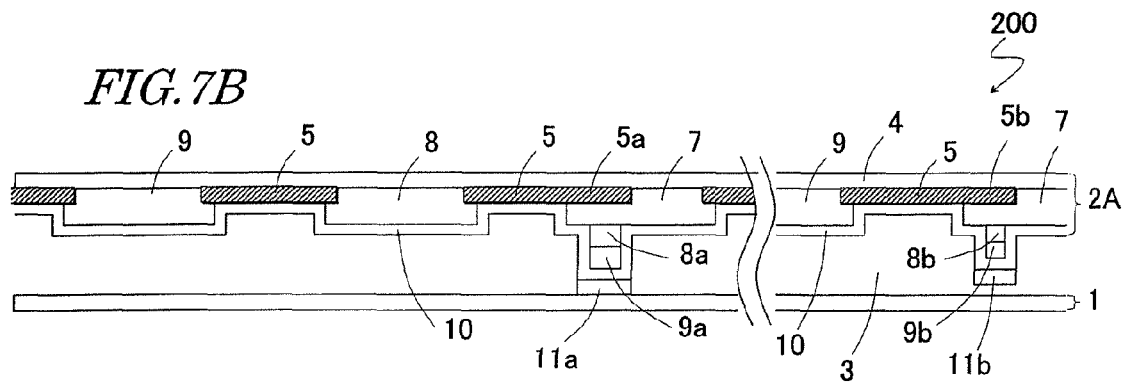
FIG. 7B is a cross-sectional view schematically illustrating the LCD 200.

Hereinafter, the structure of an LCD 200 according to a second specific embodiment of the present invention will be described with reference to FIGS. 7A and 7B. FIG. 7B is a cross-sectional view schematically illustrating the LCD 200, while FIG. 7A is a plan view schematically illustrating the columnar spacer 11a of the color filter substrate 2A of the LCD 200 and its surrounding portions. The following description of this embodiment will be focused on where the LCD 200 of this embodiment is different from the LCD 100 of the first preferred embodiment described above.

Unlike the color filter substrate 2 of the LCD 100, the color filter substrate 2A of the LCD 200 includes a plurality of undercoat layers between the columnar spacers 11a, 11b and the substrate 4.

As shown in FIGS. 7A and 7B, the color filter substrate 2A preferably includes a first undercoat layer 5a, a first type of color filter 7, a second undercoat layer 8a and a third undercoat layer 9a between the columnar spacer 11a and the substrate 4. Also, the color filter substrate 2A preferably includes a first undercoat layer 5b, a first type of color filter 7, a second undercoat layer 8b and a third undercoat layer 9b between the columnar spacer 11b and the substrate 4.

The first undercoat layer 5a, 5b is made of the same film as the light-shield layer (black matrix) 5. Specifically, in the embodiment illustrated in FIG. 7B, the two portions 5a and 5b of the first undercoat layer located on the left- and right-hand sides are preferably provided so as to have mutually different areas. That is to say, the area of the left-hand-side portion 5a of the first undercoat layer is preferably greater than that of the right-hand-side portion 5b thereof.

The second undercoat layer 8a, 8b is made of the same film as the second type of color filter 8, and is provided on the first type of color filters 7 so as to overlap with the portions 5a and 5b of the first undercoat layer. Specifically, in the embodiment illustrated in FIG. 7B, the two portions 8a and 8b of the second undercoat layer located on the left- and right-hand sides are preferably provided so as to have mutually different areas. That is to say, the area of the left-hand-side portion 8a of the second undercoat layer is preferably greater than that of the right-hand-side portion 8b thereof.

The third undercoat layer 9a, 9b is made of the same film as theh third type of color filters 9, and is provided on the second undercoat layer 8a, 8b. Specifically, in the embodiment illustrated in FIG. 7B, the two portions 9a and 9b of the third undercoat layer located on the left- and right-hand sides are preferably provided so as to have mutually different areas. That is to say, the area of the left-hand-side portion 9a of the third undercoat layer is preferably greater than that of the right-hand-side portion 9b thereof.

The columnar spacer 11a located over the portions 5a, 8a and 9a of the first, second and third undercoat layers and the columnar spacer 11b located over the portions 5b, 8b and 9b of the first, second and third undercoat layers have mutually different heights, each of which may be defined as the distance from a reference plane (e.g., the surface of the common electrode 10 on the color filter layer) to the top of the columnar spacer 11a or 11b. Specifically, the columnar spacer 11a provided over the portions 5a, 8a and 9a with the greater area is higher than the columnar spacer 11b provided over the portions 5b, 8b and 9b with the smaller area.

Hereinafter, a method of making the color filter substrate 2A will be described with reference to FIGS. 8A through 8F.

Figure 8A:
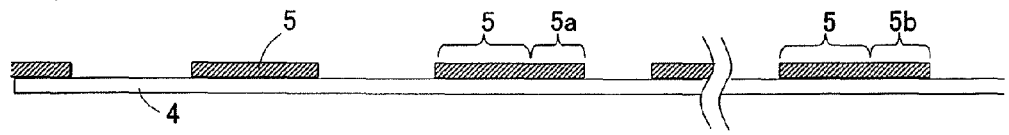
FIGS. 8A through 8F are cross-sectional views schematically illustrating the process steps of making the color filter substrate 2A of the LCD 200.

First, as shown in FIG. 8A, a light-shield layer 5 and a first undercoat layer 5a, 5b are preferably formed at the same time on the substrate 4. Specifically, a negative photoresist in which a black pigment is dispersed is preferably applied onto the surface of the substrate 4 with a spinner, dried, and the resultant photoresist film is preferably exposed to a radiation and then developed, thereby making the light-shield layer 5 and first undercoat layer 5a, 5b. In this process step, a portion 5a of the undercoat layer is preferably formed so as to have a greater area than another portion 5b of the undercoat layer.

Figure 8B:
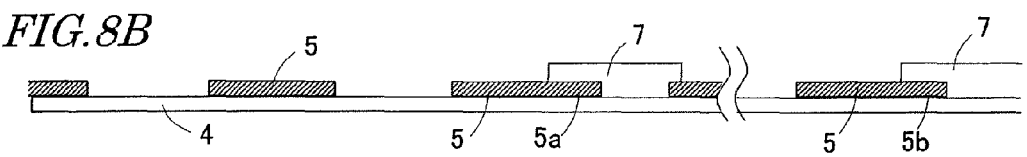

Next, as shown in FIG. 8B, first type of color filters 7 are preferably formed. Specifically, a negative photoresist in which a pigment in a desired color (e.g., red) is dispersed is preferably applied onto the surface of the substrate 4 with a spinner, dried, and the resultant photoresist film is preferably exposed to a radiation and then developed, thereby forming the first type of color filters 7. In this process step, the first type of color filters 7 also overlaps with the first undercoat layer 5a, 5b.

Figure 8C:
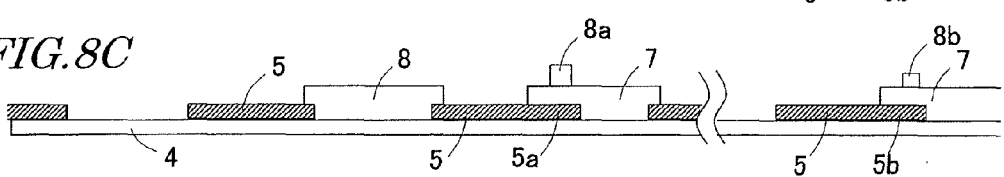

Subsequently, as shown in FIG. 8C, second type of color filters 8 and a second undercoat layer 8a, 8b are preferably formed at the same time. Specifically, using a negative photoresist in which a pigment in a desired color (e.g., green) is dispersed, the second type of color filters 8 and the second undercoat layer 8a, 8b are made in quite the same way as in the process step of forming the first type of color filters 7. In this process step, the portions 8a, 8b of the second undercoat layer are preferably positioned so as to overlap with the portions 5a, 5b of the first undercoat layer. More particularly, the portion 8a of the second undercoat layer, overlapping with the portion 5a of the first undercoat layer with the greater area, is preferably formed so as to have a greater area than the portion 8b of the second undercoat layer, overlapping with the portion 5b of the first undercoat layer with the smaller area.

Figure 8D:
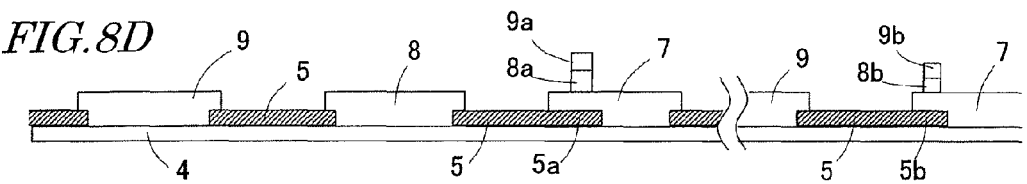

Thereafter, as shown in FIG. 8D, third type of color filters 9 and a third undercoat layer 9a, 9b are preferably formed at the same time. Specifically, using a negative photoresist in which a pigment in a desired color (e.g., blue) is dispersed, the third type of color filters 9 and the third undercoat layer 9a, 9b are made in quite the same way as in the process step of forming the second type of color filters 8 and the second undercoat layer 8a, 8b. In this process step, the portions 9a, 9b of the third undercoat layer are preferably positioned so as to overlap with the portions 8a, 8b of the second undercoat layer. More particularly, the portion 9a of the third undercoat layer, overlapping with the portion 8a of the second undercoat layer with the greater area, is preferably formed so as to have a greater area than the portion 9b of the third undercoat layer, overlapping with the portion 8b of the second undercoat layer with the smaller area.

Figure 8E:
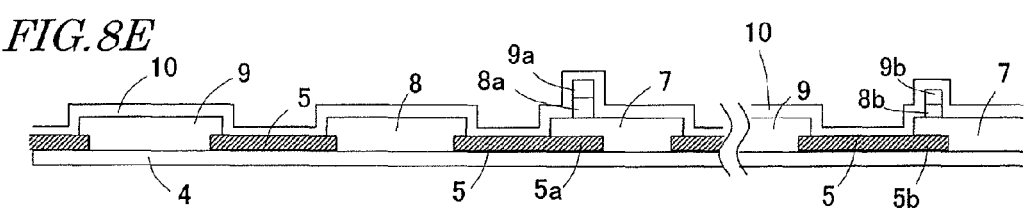

Subsequently, as shown in FIG. 8E, a common electrode 10 is preferably formed. The common electrode 10 may be made of a transparent conductive material such as ITO and may be deposited by a sputtering process, for example.

Figure 8F:
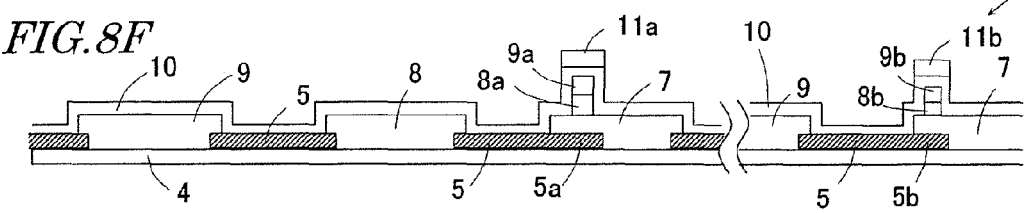

Thereafter, as shown in FIG. 8F, columnar spacers 11a and 11b are preferably formed on the common electrode 10, thereby completing the color filter substrate 2A. Specifically, a positive photoresist is preferably applied onto the substrate 4 with a spinner, dried, and the resultant photoresist film is preferably exposed to a radiation and then developed, thereby making the columnar spacers 11a and 11b. The columnar spacers 11a and 11b are preferably provided so as to overlap the multilayer structures, each consisting of multiple undercoat layers.

If the color filter substrate 2A is made by this process, the columnar spacers 11a and 11b are made of the same material and formed in the same process step but have mutually different heights. Specifically, the height h1 of the columnar spacer 11a provided over the portions 5a, 8a and 9a of the undercoat layers with the greater area exceeds the height h2 of the columnar spacer 11b provided over the portions 5b, 8b and 9b with the smaller area.

Hereinafter, the correlation between the heights of the columnar spacers and the areas of these portions of the undercoat layers will be described.

Figure 9:
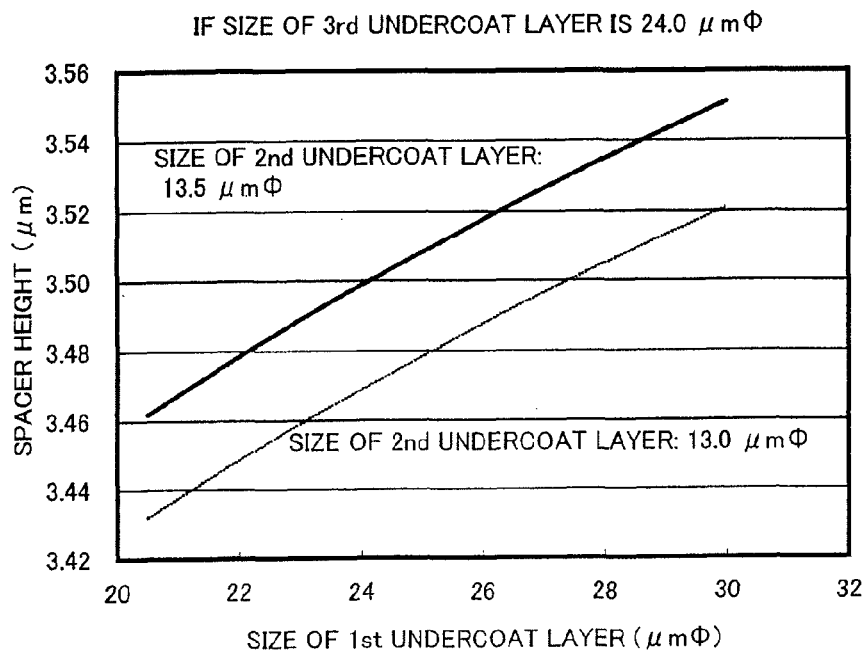
FIG. 9 is a graph showing how the height ($\mu m$) of a columnar spacer changes with the sizes ($\mu m\phi$) of first, second and third undercoat layers.
Figure 10:
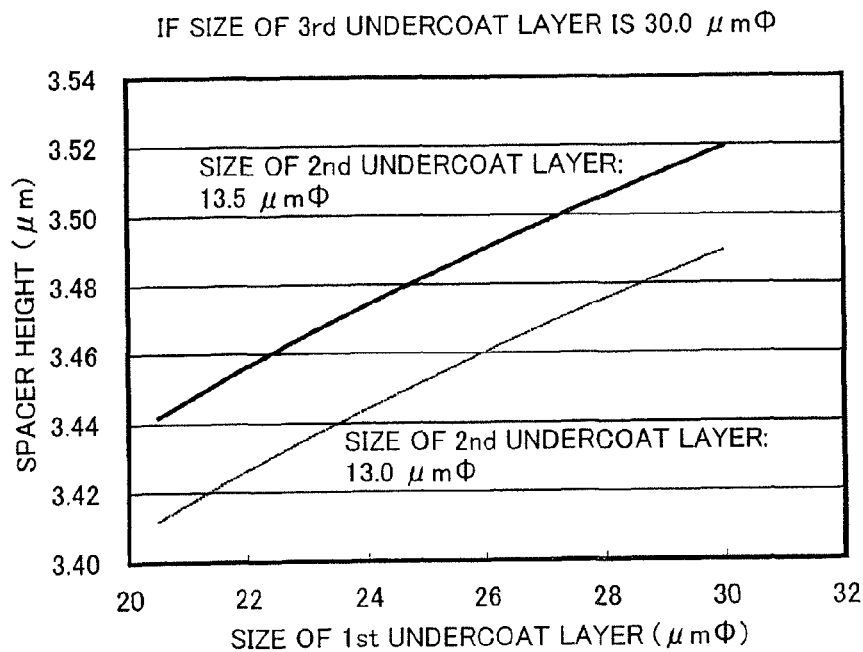
FIG. 10 is a graph showing how the height ($\mu m$) of the columnar spacer changes with the sizes ($\mu m\phi$) of the first, second and third undercoat layers.
Figure 11A:
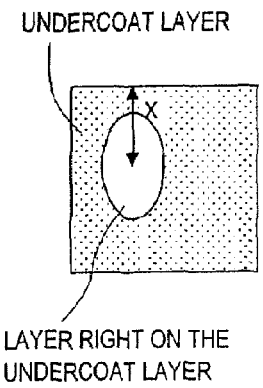
FIGS. 11A through 11D are plan views illustrating how to define the size of an undercoat layer.
Figure 11B:
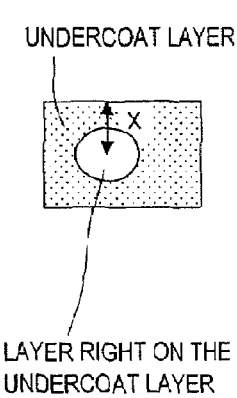
Figure 11C:
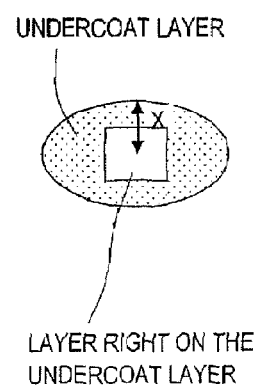
Figure 11D:
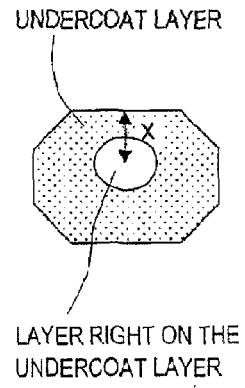

The present inventors measured the heights of a columnar spacer with the area of its associated portion of the undercoat layer changed on the color filter substrate 2A made by the method described above. The results are shown in FIGS. 9 and 10. In this case, some of the undercoat layers (more particularly, the first undercoat layer) had substantially square portions. In the drawings to be referred to in the following description, if the shortest distance from the outer edge of an undercoat layer to the center of mass of a layer that is located right on the undercoat layer is X (μm) as viewed perpendicularly to the principal surface of the substrate, the size of that undercoat layer is represented as 2X μmφ as shown in FIGS. 11A through 11D. A negative photoresist was used as the material of the light-shield layer and the respective types of color filters, while a positive photoresist was used as the material of the columnar spacers. The thicknesses of the respective types of color filters were adjusted to around 2.0 μm, while those of the light-shield layer and columnar spacers were adjusted to around 1.4 μm. The sizes of the first, second and third undercoat layers were changed as follows (which is represented by a designed value for a photomask). The other manufacturing conditions are as shown in the following Table 2:

First undercoat layer: 20.5 μmφ, 22.0 μmφ, 25.0 μmφ, and 30.0 μmφ
Second undercoat layer: 13.0 μmφ and 13.5 μmφ
Third undercoat layer: 24.0 μmφ and 30.0 μmφ

TABLE 2

|  | Light-shield layer | Color filter layer | Columnar spacer |
|---|---|---|---|
| Substrate Used | Glass substrate with a thickness of 0.7 mm | | |
| Spin coating | 450 rpm × 10 sec | 450 rpm × 10 sec | 650 rpm × 10 sec |
| Exposure | 100 mJ | 100 mJ | 100 mJ |
| Development | 1.5% Na$_2$CO$_3$/NaHCO$_3$ | 1.5% Na$_2$CO$_3$/NaHCO$_3$ | 2.3% TMAH |
| Baking | 230° C. × 60 min | 230° C. × 60 min | 230° C. × 60 min |

As can be seen from FIGS. 9 and 10, there is a close correlation between the height of the columnar spacer and the sizes of the first, second and third undercoat layers. For example, the correlation between the height of the columnar spacer and the size of the first undercoat layer has linearity. That is to say, the greater the size of the first undercoat layer, the higher the columnar spacer. Also, as the size of the second undercoat layer increases, the height of the columnar spacer increases, too.

Thus, if a number of undercoat layers are provided between the substrate and a columnar spacer as is done in this embodiment, the height of the columnar spacer (i.e., the distance from a reference plane to the top of the columnar spacer) may be controlled by adjusting the area and/or shape of at least one of those undercoat layers. If the areas and/or shapes of two or more of the undercoat layers are adjusted, then the controllable height range can be expanded as compared with the first embodiment in which the area and/or shape of only one undercoat layer is controlled.

Suppose the sizes of the first, second and third undercoat layers and the height of the columnar spacer have correlations such as those shown in FIGS. 9 and 10. In that case, to set the heights of the higher and lower columnar spacers 11a and 11b to 3.55 μm and 3.40 μm, respectively, the portions 5a, 8a and 9a of the first, second and third undercoat layers associated with the higher columnar spacer 11a may have a size of 30.0 μmφ, 13.5 μmφ and 24.0 μmφ, respectively, while the portions 5b, 8b and 9b of the first, second and third undercoat layers associated with the lower columnar spacer 11b may have a size of 20.0 μmφ, 13.5 μmφ and 30.0 μmφ, respectively.

In this case, the heights and elasticity of the columnar spacers 11a and 11b are preferably defined such that the variation in cell gap becomes smaller than the level difference between these columnar spacers 11a and 11b when the temperature decreases from room temperature (e.g., 23° C.) to a low temperature (e.g., −20° C.). By adopting such setting, while no load is being applied to the LCD 200, the cell gap is defined by only the higher columnar spacers 11a. That is why by adjusting the density of the higher columnar spacers 11a, the cell gap can catch up with the shrinkage of the liquid crystal layer and the production of low-temperature bubbles can be minimized. Also, when the cell gap decreases due to the pressure applied by user's fingers on the LCD 100, the two substrates are supported by both the higher and lower columnar spacers 11a and 11b alike. As a result, high withstand load is realized.

To make the cell gap catch up with the shrinkage of the liquid crystal layer and to achieve sufficiently high resistance even when load is applied to the LCD, the higher columnar spacers 11a preferably have a density of about 0.015% and the lower columnar spacers 11b preferably have a density of about 0.02%.

As described above, the height of a columnar spacer is correlated to the area and/or shape of its associated portion of the undercoat layer. The present inventors modeled and tested various sample products. As a result, the present inventors discovered via experiments that the height h (μm) of each columnar spacer (i.e., the distance measured from a reference plane) and the shortest distance X (μm) from the center of mass of the columnar spacer to the outer edge of its associated portion of the undercoat layer as viewed perpendicularly to the principal surface of the base substrate are correlated to each other so as to satisfy the following Equations (1) and (2):

$$h = a + b \cdot 2X \quad (1)$$

$$0.008 \leq b \leq 0.06 \quad (2)$$

where a is a prescribed constant. As viewed perpendicularly to the principal surface of a base substrate, the center of mass of each columnar spacer typically matches that of a layer deposited right on its associated portion of the undercoat layer. That is why the distance X typically agrees with the distance X shown in FIGS. 11A through 11D.

The present inventors discovered via experiments that the constant b, showing the degree of variation in height h with respect to the increase in the size (=2X) of the undercoat layer, was greater when a dry film process was adopted to form the light-shield layer and color filters than when a liquid photosensitive resin was applied as in a spin coating process. This is probably because the thickness of the film decreases due to both the unintentional flow of the material being deposited and the thermal stretch according to the latter process, whereas the decrease in film thickness is rarely caused by the unintentional flow of the material being deposited but is mostly brought about by the thermal stretch according to the former dry film process. That is why if the level difference between the columnar spacers should be increased, the light-shield layer and color filter layer are preferably formed by a dry film process.

As can be seen from Equations (1) and (2) mentioned above, the heights h1 and h2 (μm) of the higher and lower columnar spacers, the shortest distance X1 (μm) from the center of mass of the higher columnar spacer to the outer edge of its associated portion of the undercoat layer, and the shortest distance X2 (μm) from the center of mass of the lower columnar spacer to the outer edge of its associated portion of the undercoat layer preferably satisfy the inequality: $0.008 \leq (h1-h2)/2(X1-X2) \leq 0.06$.

Embodiment 3

Figure 12:
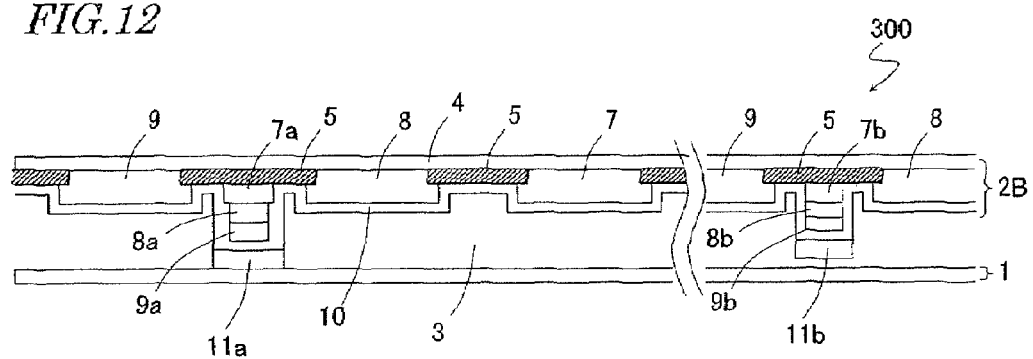
FIG. 12 is a cross-sectional view schematically illustrating an LCD 300 according to a third specific embodiment of the present invention.

Hereinafter, the structure of an LCD 300 according to a third specific embodiment of the present invention will be described with reference to FIG. 12. FIG. 12 is a cross-sectional view schematically illustrating the LCD 300.

Unlike the color filter substrate 2A shown in FIG. 8, the color filter substrate 2B of the LCD 300 includes columnar spacers 11a, 11b overlapping with the light-shield layer 5.

As shown in FIG. 12, the color filter substrate 2B preferably includes a first undercoat layer 7a, a second undercoat layer 8a and a third undercoat layer 9a between the columnar spacer 11a and the light-shield layer 5. Also, the color filter substrate 2B preferably includes a first undercoat layer 7b, a second undercoat layer 8b and a third undercoat layer 9b between the columnar spacer 11b and the light-shield layer 5.

The first undercoat layer 7a, 7b is made of the same film as the first type of color filters 7 and is provided on the light-shield layer 5. Specifically, in the embodiment illustrated in FIG. 12, the two portions 7a and 7b of the first undercoat layer located on the left- and right-hand sides are preferably provided so as to have mutually different areas. That is to say, the area of the left-hand-side portion 7a of the first undercoat layer is preferably greater than that of the right-hand-side portion 7b thereof.

The second undercoat layer 8a, 8b is made of the same film as the second type of color filter 8, and is provided on the portions 7a and 7b of the first undercoat layer. Specifically, in the embodiment illustrated in FIG. 12, the two portions 8a and 8b of the second undercoat layer located on the left- and right-hand sides preferably have the same area.

The third undercoat layer 9a, 9b is made of the same film as the third type of color filters 9, and is provided on the second undercoat layer 8a, 8b. Specifically, in the embodiment illustrated in FIG. 12, the two portions 9a and 9b of the third undercoat layer located on the left- and right-hand sides preferably have the same area.

The columnar spacer 11a located over the portions 7a, 8a and 9a of the first, second and third undercoat layers and the columnar spacer 11b located over the portions 7b, 8b and 9b of the first, second and third undercoat layers have mutually different heights, each of which may be defined as the distance from a reference plane (e.g., the surface of the common electrode 10 on the color filter layer) to the top of the columnar spacer 11a or 11b. Specifically, the columnar spacer 11a overlapping with the portion 7a of the first undercoat layer with the greater area is higher than the columnar spacer 11b overlapping with the portions 7b with the smaller area.

Hereinafter, a method of making the color filter substrate 2B will be described with reference to FIGS. 13A through 13F.

Figure 13A:
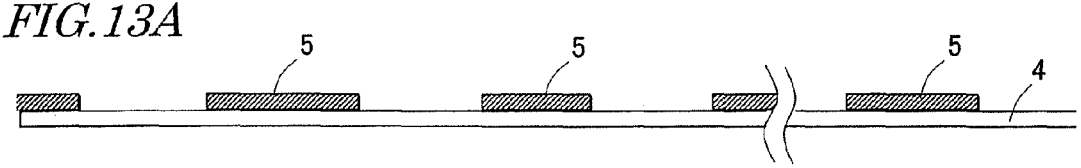
FIGS. 13A through 13F are cross-sectional views schematically illustrating the process steps of making the color filter substrate 2B of the LCD 300.

First, as shown in FIG. 13A, a light-shield layer 5 is preferably formed on the substrate 4. The light-shield layer 5 may be formed by either a dry film process as described for the first embodiment or a spin coating process as described for the second embodiment.

Figure 13B:
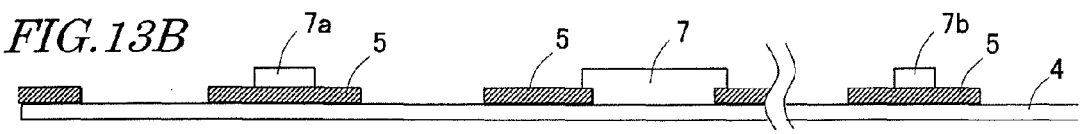

Next, as shown in FIG. 13B, first type of color filters 7 and a first undercoat layer 7a, 7b are preferably formed at the same time. The first type of color filters 7 and first undercoat layer 7a, 7b may be formed by either a dry film process or a spin coating process, for example. In this process step, the first undercoat layer 7a, 7b is preferably provided on the light-shield layer 5 such that the portion 7a of the first undercoat layer has a greater area than the portion 7b of the first undercoat layer.

Figure 13C:
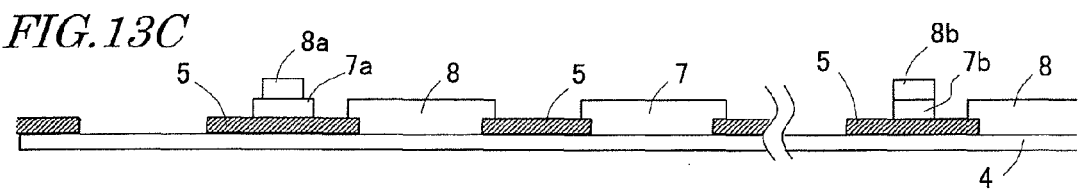

Subsequently, as shown in FIG. 13C, second type of color filters 8 and a second undercoat layer 8a, 8b are preferably formed at the same time. The second type of color filters 8 and second undercoat layer 8a, 8b may be formed by either a dry film process or a spin coating process, for example. In this process step, the second undercoat layer 8a, 8b is preferably provided on the first undercoat layer 7a, 7b.

Figure 13D:
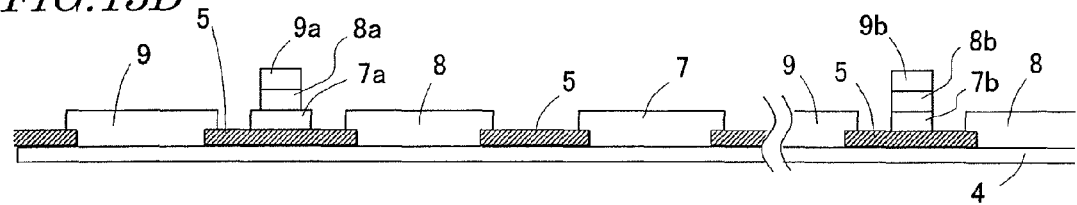

Thereafter, as shown in FIG. 13D, third type of color filters 9 and a third undercoat layer 9a, 9b are preferably formed at the same time. The third type of color filters 9 and third undercoat layer 9a, 9b may be formed by either a dry film process or a spin coating process, for example. In this process step, the third undercoat layer 9a, 9b is preferably provided on the second undercoat layer 8a, 8b.

Figure 13E:
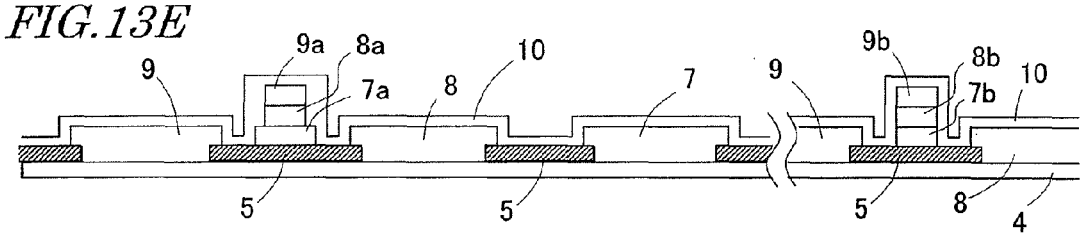

Subsequently, as shown in FIG. 13E, a common electrode 10 is preferably formed. The common electrode 10 may be made of a transparent conductive material such as ITO and may be deposited by a sputtering process, for example.

Figure 13F:
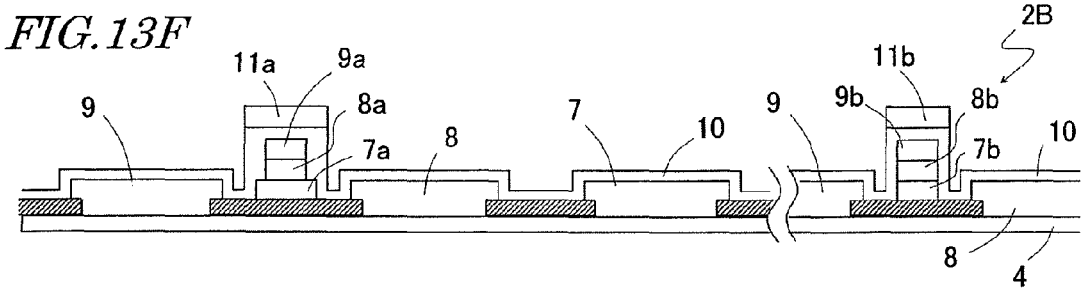

Thereafter, as shown in FIG. 13F, columnar spacers 11a and 11b are preferably provided on the common electrode 10, thereby completing the color filter substrate 2B. The columnar spacers 11a and 11b may be formed by either a dry film process or a spin coating process, for example. The columnar spacer 11a is preferably provided so as to overlap with the multilayer structure consisting of the first, second and third undercoat layers 7a, 8a and 9a, while the columnar spacer 11b is preferably provided so as to overlap with the multilayer structure consisting of the first, second and third undercoat layers 7b, 8b and 9b.

If the color filter substrate 2B is made by this process, the columnar spacers 11a and 11b are made of the same material and formed in the same process step but have mutually different heights. Specifically, the columnar spacer 11a overlapping the portion 7a of the first undercoat layer with the greater area is higher than the columnar spacer 11b overlapping the portion 7b of the first undercoat layer with the smaller area.

As described above, according to this embodiment, one of the three undercoat layers, each of which is made of the same film as color filters in its associated color, has a number of portions with mutually different areas (or shapes), thereby making a difference between the heights of the columnar spacers 11a and 11b (i.e., the distances from a reference plane to the respective tops of the columnar spacers). Specifically, the bottom undercoat layer has a number of portions with respectively different areas in the embodiment described above. Alternatively, any undercoat layer other than the bottom layer may also have a number of portions with mutually different areas (or shapes) as in the color filter substrate 2C of the LCD 300' shown in FIG. 14 or in the color filter substrate 2D of the LCD 300" shown in FIG. 15.

Figure 14:
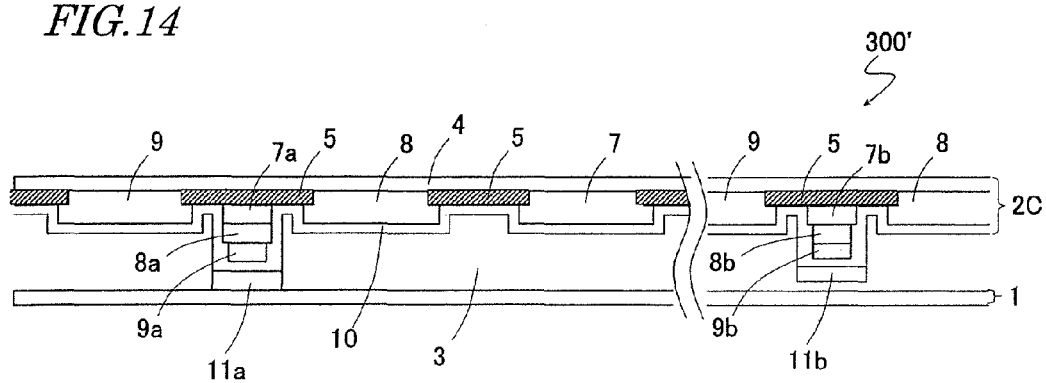
FIG. 14 is a cross-sectional view schematically illustrating an LCD 300' according to an alternative embodiment of the present invention.

Specifically, in the color filter substrate 2C shown in FIG. 14, the portions 7a and 7b of the first undercoat layer, made of the same film as the first type of color filters 7, have the same area, and the portions 9a and 9b of the third undercoat layer, made of the same film as the third type of color filters 9, have the same area, too. But the portions 8a and 8b of the second undercoat layer, made of the same film as the second type of color filters 8, have mutually different areas.

Figure 15:
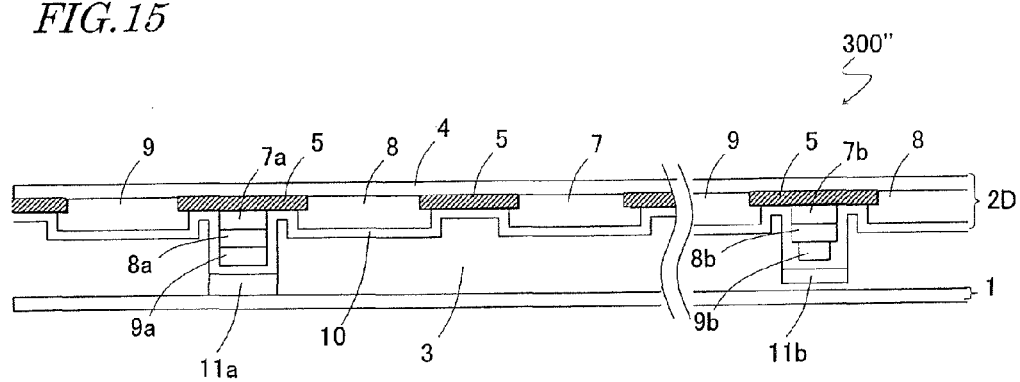
FIG. 15 is a cross-sectional view schematically illustrating an LCD 300'' according to another alternative embodiment of the present invention.

On the other hand, in the color filter substrate 2D shown in FIG. 15, the portions 7a and 7b of the first undercoat layer, made of the same film as the first type of color filters 7, have the same area, and the portions 8a and 8b of the second undercoat layer, made of the same film as the second type of color filters 8, have the same area, too. But the portions 9a and 9b of the third undercoat layer, made of the same film as the third type of color filters 9, have mutually different areas.

In this manner, even if either the intermediate or top one of the three undercoat layers has a number of portions with mutually different areas (or shapes), the columnar spacers 11a and 11b can also have different heights. It is naturally possible to make the areas and/or shapes of a number of portions different in two of the three undercoat layers or even in all of the three undercoat layers.

Embodiment 4

In the first through third embodiments of the present invention described above, two or more groups of columnar spacers with different heights are arranged within a single color filter substrate. However, the present invention is in no way limited to those specific embodiments. The columnar spacers are typically formed on a mother substrate including a plurality of regions to be cut into respective color filter substrates. Accordingly, by controlling the areas and/or shapes of respective portions of an undercoat layer for those regions associated with color filter substrates, the heights of the columnar spacers can be changed from one of those regions to another. That is why even if a single mother substrate should be divided into a plurality of substrates of mutually different sizes, the heights of the columnar spacers can be easily controlled according to the sizes of those substrates. As a result, the floor plan on the mother substrate can be designed far more freely. Consequently, the mother substrate can be used much more effectively and the manufacturing cost can be cut down significantly.

Suppose the size of the undercoat layer and the height of the columnar spacer have a correlation such as that shown in FIG. 4. In that case, to make a color filter substrate including columnar spacers with a height of 3.4 µm and a color filter substrate including columnar spacers with a height of 3.0 µm at the same time, the portion of the undercoat layer associated with the former color filter substrate may have a size of 24.0 µmϕ, while the portion of the undercoat layer associated with the latter color filter substrate may have a size of 19.0 µmϕ.

On the other hand, suppose the sizes of the first, second and third undercoat layers and the height of the columnar spacer have correlations such as those shown in FIGS. 9 and 10. In that case, to make a color filter substrate including columnar spacers with a height of 3.55 µm and a color filter substrate including columnar spacers with a height of 3.40 µm at the same time, the portions of the first, second and third undercoat layers may have sizes of 30.0 µmϕ, 13.5 µmϕ and 24.0 µmϕ, respectively, for the former color filter substrate, while the portions of the first, second and third undercoat layers may have sizes of 20.0 µmϕ, 13.5 µmϕ and 30.0 µmϕ, respectively, for the latter color filter substrate.

Figure 16:
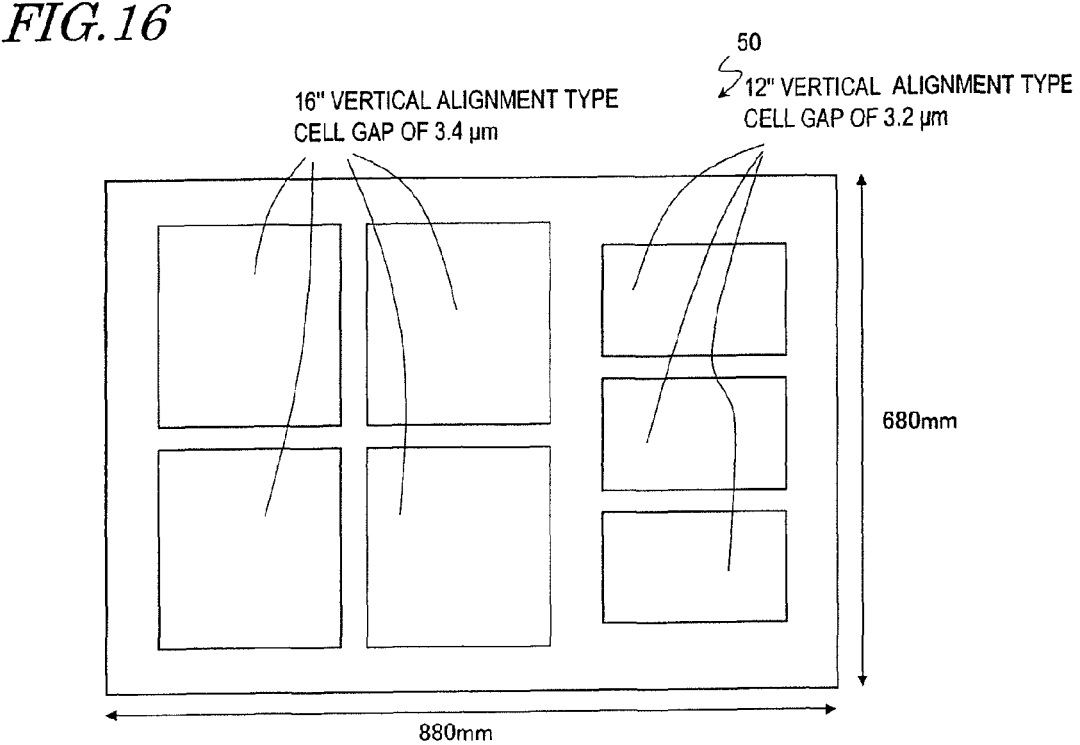
FIG. 16 is a plan view illustrating an exemplary floor plan on a mother substrate.
Figure 17:
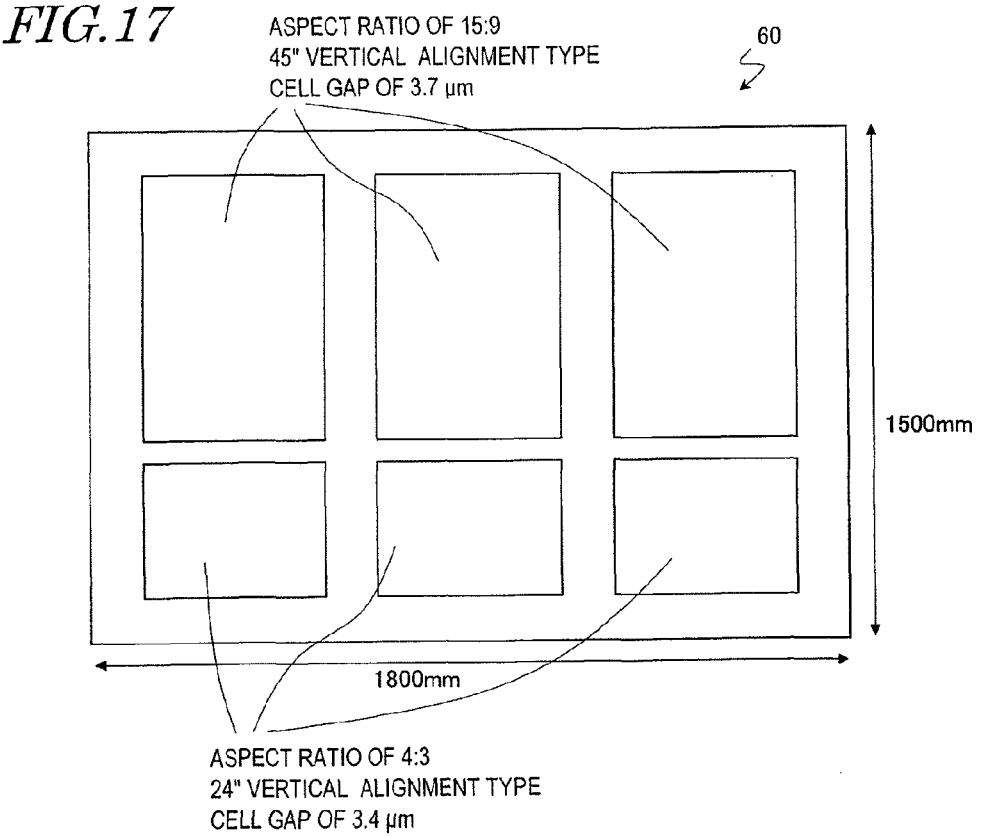
FIG. 17 is a plan view illustrating another exemplary floor plan on a mother substrate.

FIGS. 16 and 17 show exemplary floor plans on a mother substrate.

The mother substrate (of glass, for example) 50 shown in FIG. 16 has dimensions of 680 mm×880 mm. From this mother substrate 50, four color filter substrates for a vertical alignment mode LCD with a diagonal size of 16 inches and a cell gap of 3.4 µm and three color filter substrates for a vertical alignment mode LCD with a diagonal size of 12 inches and a cell gap of 3.2 µm are cut out.

The mother substrate (of glass, for example) 60 shown in FIG. 17 has dimensions of 1,500 mm×1,800 mm. From this mother substrate 60, three color filter substrates for a vertical alignment mode LCD with an aspect ratio of 15 to 9, a diagonal size of 45 inches and a cell gap of 3.7 µm and three color filter substrates for a vertical alignment mode LCD with an aspect ratio of 4 to 3, a diagonal size of 24 inches and a cell gap of 3.4 µm are cut out.

If the height of the columnar spacers and the size of the undercoat layer have the correlation shown in FIG. 4 in the floor plan shown in FIG. 16, portions of the undercoat layer with a size of 24.0 µmϕ may be allocated to color filter substrates for an LCD with a diagonal size of 16 inches and a cell gap of 3.4 µm and portions of the undercoat layer with a size of 21.5 µmϕ may be allocated to color filter substrates for an LCD with a diagonal size of 12 inches and a cell gap of 3.2 µm.

It should be noted that a method of making a color filter substrate according to an embodiment of the present invention can also be used effectively to change the types of products to manufacture. In a conventional manufacturing process, every time the cell gap needs to be changed to switch the types of products to manufacture, the process conditions should be modified. More specifically, the thickness of the film to apply, development conditions (including the concentration and temperature of a developer and a development process time), heat treatment conditions and other conditions need to be altered every time the types are switched. That is to say, in changing the types of products to manufacture, very complicated steps must be followed, thus decreasing the productivity and yield in many cases.

In contrast, in a manufacturing process according to an embodiment of the present invention, the heights of columnar spacers can be changed just by controlling the areas and/or shapes of their associated portions of the undercoat layer without modifying any other process condition. As a result, the production line can keep running smoothly and eventually the yield can be increased.

Embodiment 5

Figure 18:
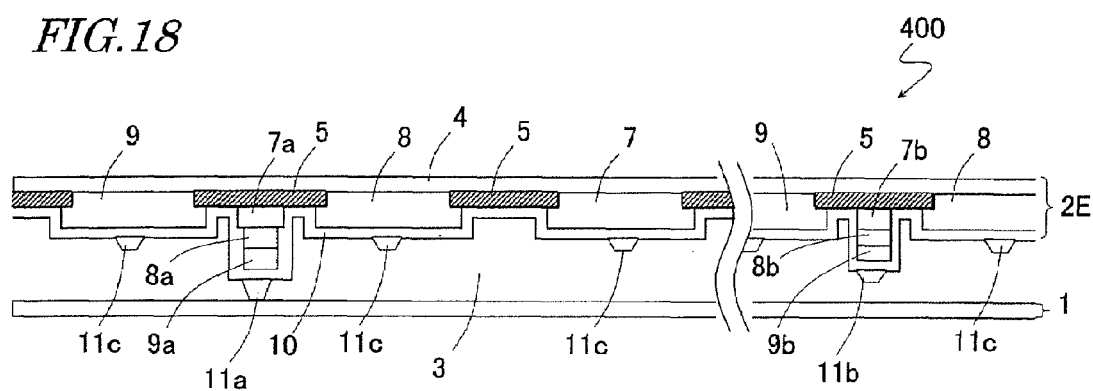
FIG. 18 is a cross-sectional view schematically illustrating an LCD 400 according to a fifth specific embodiment of the present invention.

Hereinafter, an LCD 400 according to a fifth specific embodiment of the present invention will be described with reference to FIG. 18. The LCD 400 is a so-called MVA (multi-domain vertical alignment) mode LCD.

The liquid crystal layer 3 of the LCD 400 is a vertical alignment mode liquid crystal layer. The liquid crystal layer 3 typically includes a liquid crystal material with negative dielectric anisotropy. And its liquid crystal molecules are aligned vertically to the surface of the substrates by vertical alignment films, provided on the inside surfaces of an active-matrix substrate 1 and a color filter substrate 2E so as to face the liquid crystal layer 3, while no voltage is being applied to the liquid crystal layer 3.

Unlike the color filter substrate 2B shown in FIG. 12, the color filter substrate 2E of the LCD 400 includes protrusions (ribs) 11c as an orientation-regulating structure. These protrusions 11c cause a tilt in the liquid crystal molecules of the liquid crystal layer 3 due to their surface shape.

Meanwhile, picture element electrodes on the active-matrix substrate 1 have slits (not shown), which generate an oblique electric field upon the application of a voltage, thereby causing a tilt in the liquid crystal molecules.

The protrusions 11c and slits are arranged on the color filter substrate 2E and on the active-matrix substrate 1, respectively, such that their orientation-regulating forces match each other. While a voltage is being applied to the liquid crystal layer 3, the liquid crystal molecules in the liquid crystal layer 3 have their orientations regulated by the protrusions 11c and slits. As a result, multiple liquid crystal domains with mutually different orientation azimuths are produced, and therefore, the LCD 400 can conduct a display operation in a wide viewing angle range.

If the protrusions 11c for controlling the orientations of liquid crystal molecules are made of the same photosensitive resin in the process step of forming the columnar spacers 11a, 11b, then there is no need to provide any additional process step of forming the protrusions 11c. Consequently, the LCD 400 with a wide viewing angle range can be manufactured by a simplified process.

The protrusions 11c are preferably provided so as not to overlap with the undercoat layer. That is why the protrusions 11c are lower than the columnar spacers 11a, 11b if their heights are defined as distances from a reference plane to their tops. To realize preferred anchoring force, the protrusions 11c preferably have a height of 0.7 μm to 1.8 μm.

The fifth embodiment of the present invention has been described as being applied to a so-called MVA mode LCD. However, the present invention is in no way limited to this specific embodiment. Even if such orientation controlling protrusions and columnar spacers are formed in the same process step in a manufacturing process of an alignment-divided vertical alignment type LCD, the manufacturing process can also be simplified.

Embodiment 6

Figure 19:
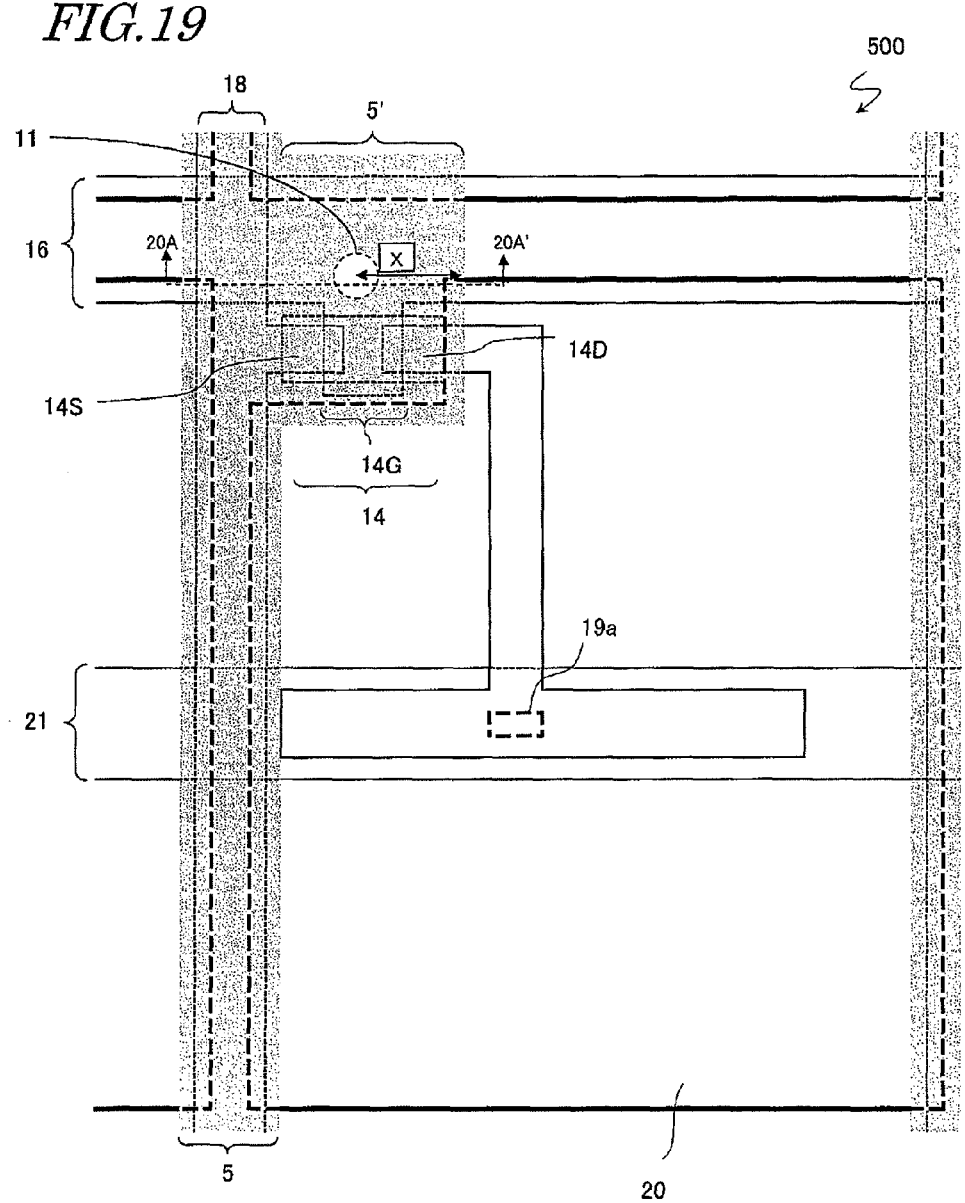
FIG. 19 is a plan view schematically illustrating an LCD 500 according to a sixth specific embodiment of the present invention.
Figure 20:
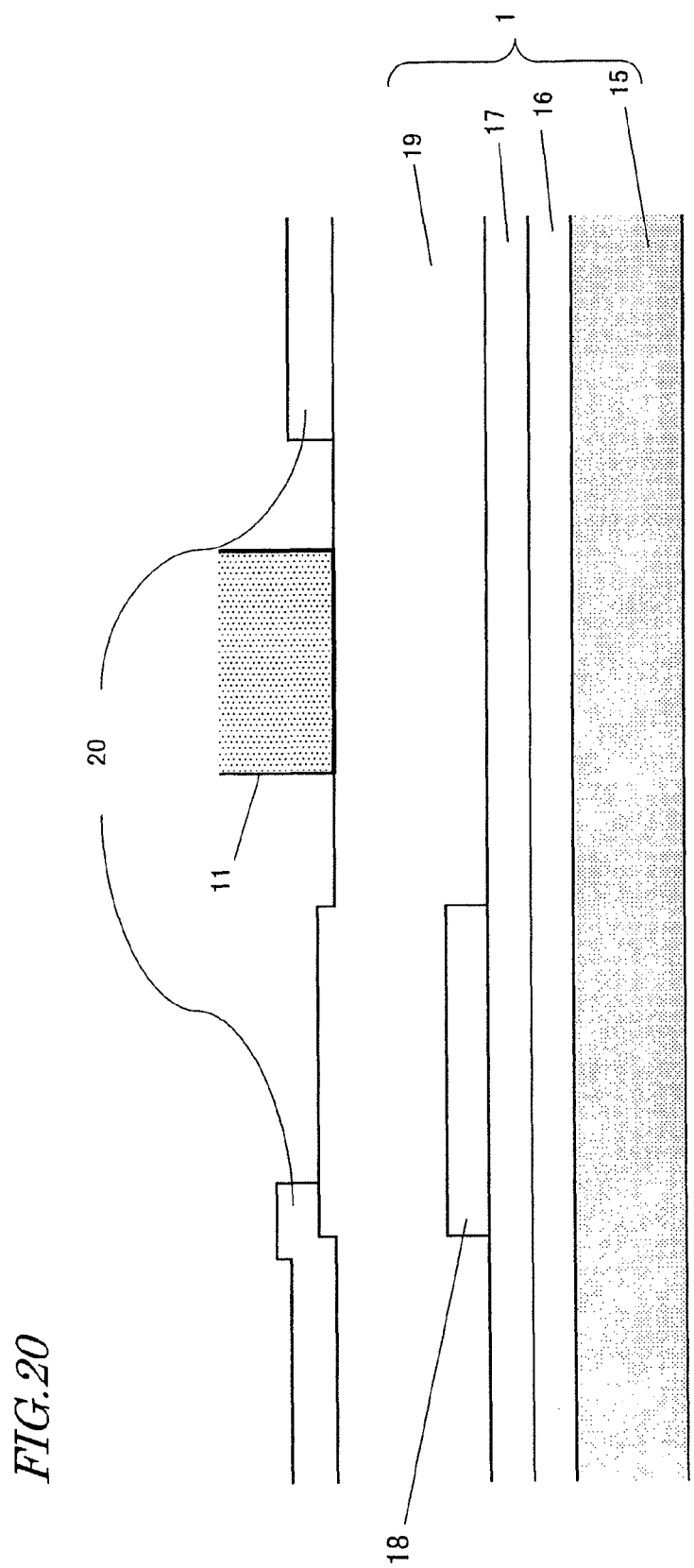
FIG. 20 is a cross-sectional view schematically illustrating the LCD 500 of the sixth embodiment as viewed along line 20A-20A' of FIG. 19.

Hereinafter, an LCD 500 according to a sixth specific embodiment of the present invention will be described with reference to FIGS. 19 and 20. FIG. 19 is a plan view schematically illustrating the LCD 500, while FIG. 20 is a cross-sectional view taken along line 20A-20A' of FIG. 19.

On the active-matrix substrate 1 of the LCD 500, a thin-film transistor (TFT) 14 is preferably provided for every picture element. The gate electrode 14G of the TFT 14 is preferably electrically connected to a gate line 16 on a transparent substrate (of glass, for example) 15, while the source electrode 14S of the TFT 14 is preferably electrically connected to a source line 18 intersecting with the gate line 16. And the drain electrode 14D of the TFT 14 is preferably electrically connected to a picture element electrode 20 by way of a contact hole 19a, which is cut through an interlayer dielectric film 19 that covers the source line 18 and the TFT 14. In this example, the contact hole 19a is preferably located over a storage capacitor line 21.

The interlayer dielectric film 19 may be made of a photosensitive acrylic resin, for example. If the picture element electrode 20 is provided on this interlayer dielectric film 19 as is done in this embodiment, then the picture element electrode 20 can be laid out so as to partially overlap with the gate line 16 and/or the source line 18. As a result, the aperture ratio can be increased advantageously.

The color filter substrate of the LCD 500 preferably includes a transparent substrate (not shown) and a light-shield layer 5 and a color filter layer (not shown in FIG. 19 or 20) provided on the transparent substrate. As shown in FIG. 19, the light-shield layer 5 preferably includes a TFT shielding portion 5' for shielding the TFT 14 from light. The TFT shielding portion 5' is provided so as to face the TFT 14. And a columnar spacer 11 of a photosensitive resin is preferably provided over this TFT shielding portion (switching element shielding portion) 5'.

The TFT shielding portion 5' is located between the columnar spacer 11 and the transparent substrate, and therefore, can not only shield the TFT 14 from external light but also function as an undercoat layer for the columnar spacer 11. That is to say, by adjusting the area of the TFT shielding portion 5', the height of the columnar spacer 11 (i.e., the distance from a reference plane to the top of that columnar spacer) can be controlled. Also, although not shown particularly in any drawing, another undercoat layer, made of the same film as color filters, may also be interposed between the TFT shielding portion 5' and the columnar spacer 11.

In this embodiment, the TFT shielding portion 5' also functions as an undercoat layer for the columnar spacer 11. Thus, the aperture ratio can be increased to realize a brighter display. The reasons are as follows.

Figure 21:
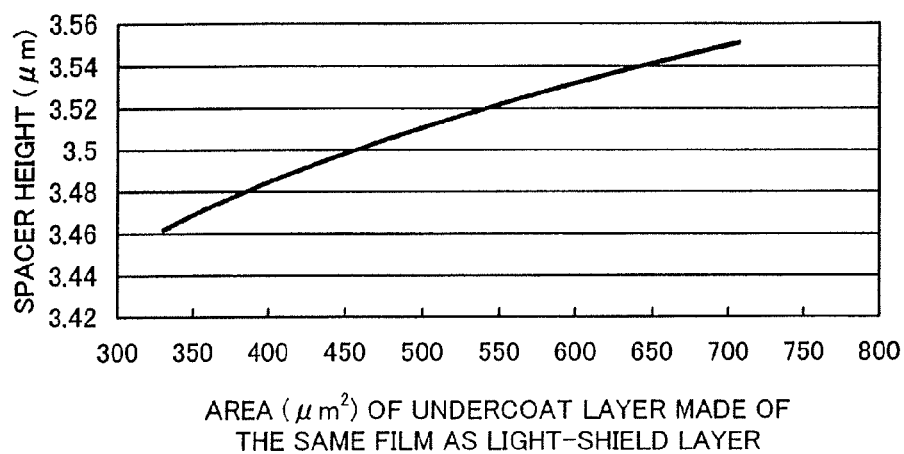
FIG. 21 is a graph showing how the height ($\mu m$) of a columnar spacer changes with the area ($\mu m^2$) of an undercoat layer that is made of the same film as a light-shield layer.

In controlling the height of a columnar spacer by adjusting the area of its associated portion of the undercoat layer, which is made of the same film as the light-shield layer, the columnar spacer cannot be high enough unless the area of its associated portion of the undercoat layer is increased sufficiently. FIG. 21 shows how the height of a columnar spacer changes with the area of an undercoat layer that is made of the same film as a light-shield layer. In the example shown in FIG. 21, to set the height of the columnar spacer to 3.47 μm, the undercoat layer should have an area of 350 μm². However, to increase the height of the columnar spacer to 3.55 μm, the undercoat layer should have an area of 700 μm². That is to say, in order to increase the height of the columnar spacer by 0.08 μm, the area of the undercoat layer needs to be doubled.

In this manner, the columnar spacer cannot be sufficiently high unless the area of its associated portion of the undercoat layer (which is made of the same film as the light-shield layer) is increased significantly. Thus, depending on the desired height of the columnar spacer, the decrease in aperture ratio could be a problem.

According to this embodiment, however, the TFT shielding portion 5' of the light-shield layer 5 is used as an undercoat layer. Thus, the height of the columnar spacer 11 can be increased sufficiently and a brighter display is realized without decreasing the aperture ratio unnecessarily. For example, when the inventors of the present invention applied the configuration of this embodiment to a 32-inch panel compliant with a standard, the aperture ratio could be increased by about 3.5% compared to a situation where an undercoat layer was provided separately from the TFT shielding portion 5'.

Also, in this embodiment, the columnar spacer 11 is arranged so as not to overlap with the picture element electrode 20 as shown in FIG. 20. By adopting such an arrangement, no short-circuit should occur between a common electrode (see FIG. 1, for example) located under the columnar spacer 11 and the picture element electrode 20. As a result, the electrical reliability of the display device can be increased.

Furthermore, to make the cell gap even more uniform, the columnar spacer 11 is preferably provided over a relatively flat surface area of the active-matrix substrate 1 considering the unevenness at the surface of the active-matrix substrate 1. For example, as shown in FIG. 20, the columnar spacer 11 is preferably arranged so as to make contact with a multilayer structure consisting of the gate line 16, gate insulating film 17 and interlayer dielectric film 19 and not to overlap with an intersection between the gate line 16 and source line 18 where the degree of flatness is usually low.

Embodiment 7

In the first through sixth embodiments of the present invention described above, a columnar spacer made of a photosensitive resin is supposed to be arranged over an undercoat layer made of the same film as a light-shield layer or a color filter layer. However, the present invention is in no way limited to those specific embodiments. Alternatively, the present invention is also applicable for use even in an arrangement in which a multilayer structure, including at least two resin layers made of the same film as a light-shield layer or a color filter layer, functions as a spacer by itself.

Hereinafter, an LCD 600 according to a seventh specific embodiment of the present invention will be described with reference to FIG. 22. The color filter substrate 2F of the LCD 600 preferably includes structures 12a and 12b that stick out of a color filter layer including first, second and third types of color filters 7, 8 and 9. Specifically, the structure 12a is a multilayer structure including portions 5a, 7a, 8a and 9a of first, second, third and fourth resin layers, while the structure 12b is a multilayer structure including other portions 5b, 7b, 8b and 9b of the first, second, third and fourth resin layers.

The first resin layer 5a, 5b is made of the same film as the light-shield layer 5, while the second resin layer 7a, 7b is made of the same film as the first type of color filters 7. Specifically, in the embodiment illustrated in FIG. 22, the two portions 7a and 7b of the second resin layer located on the left- and right-hand sides are preferably provided so as to have mutually different areas. That is to say, the area of the left-hand-side portion 7a of the second resin layer is preferably greater than that of the right-hand-side portion 7b thereof.

The third resin layer 8a, 8b is made of the same film as the second type of color filters 8, and is provided on the portions 7a and 7b of the second resin layer. Specifically, in the embodiment illustrated in FIG. 22, the two portions 8a and 8b of the third resin layer located on the left- and right-hand sides preferably have the same area.

The fourth resin layer 9a, 9b is made of the same film as the third type of color filters 9, and is provided on the third resin layer 8a, 8b. Specifically, in the embodiment illustrated in FIG. 22, the two portions 9a and 9b of the fourth resin layer located on the left- and right-hand sides preferably have the same area.

Figure 22:
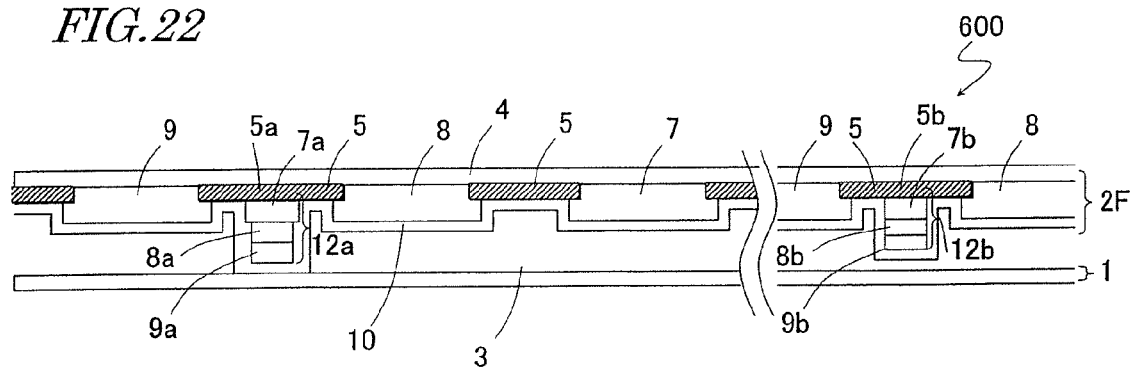
FIG. 22 is a cross-sectional view schematically illustrating an LCD 600 according to a seventh specific embodiment of the present invention.

The multilayer structures 12a and 12b located on the left- and right-hand sides of FIG. 22 have mutually different heights, each of which may be defined as the distance from a reference plane (e.g., the surface of the common electrode 10 on the color filter layer) to the top of the multilayer structure 12a or 12b. Specifically, the multilayer structure 12a including the portion 7a of the second resin layer with the greater area is higher than the multilayer structure 12b including the portion 7b of the second resin layer with the smaller area.

In the LCD 600 of this embodiment, the multilayer structures 12a and 12b function as spacers for controlling the cell gap. In a normal state, the two substrates are supported only by the higher multilayer structure 12a. But when the cell gap decreases upon the application of load to the LCD 600, the two substrates are supported by both of these multilayer structures 12a and 12b.

Hereinafter, a method of making the color filter substrate 2F will be described with reference to FIGS. 23A through 23F.

Figure 23A:
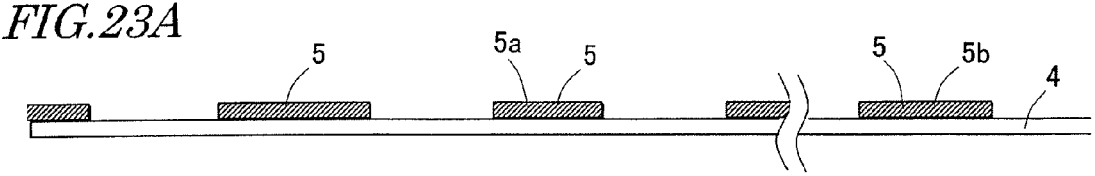
FIGS. 23A through 23E are cross-sectional views schematically illustrating the process steps of making the color filter substrate 2F of the LCD 600.

First, as shown in FIG. 23A, a light-shield layer 5 and a first resin layer 5a, 5b are preferably formed on the substrate 4 at the same time. The light-shield layer 5 and first resin layer 5a, 5b may be formed by either a dry film process as described for the first embodiment or a spin coating process as described for the second embodiment.

Figure 23B:
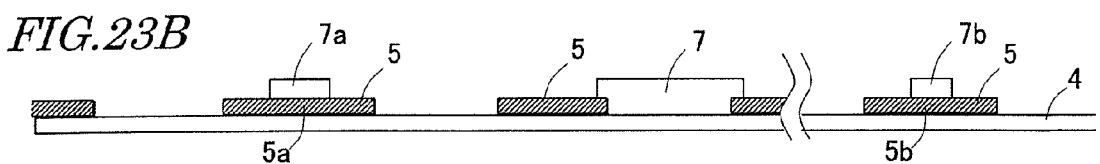

Next, as shown in FIG. 23B, first type of color filters 7 and a second resin layer 7a, 7b are preferably formed at the same time. The first type of color filters 7 and second resin layer 7a, 7b may be formed by either a dry film process or a spin coating process, for example. In this process step, the second resin layer 7a, 7b is preferably provided on the first resin layer 5a, 5b such that the portion 7a of the second resin layer has a greater area than the portion 7b of the second resin layer.

Figure 23C:
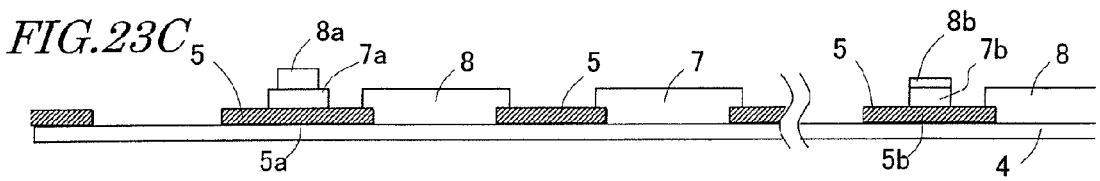

Subsequently, as shown in FIG. 23C, second type of color filters 8 and a third resin layer 8a, 8b are preferably formed at the same time. The second type of color filters 8 and third resin layer 8a, 8b may be formed by either a dry film process or a spin coating process, for example. In this process step, the third resin layer 8a, 8b is preferably provided on the second resin layer 7a, 7b.

Figure 23D:
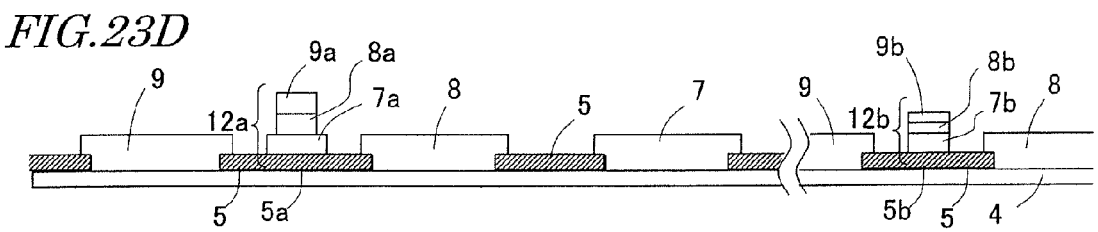

Thereafter, as shown in FIG. 23D, third type of color filters 9 and a fourth resin layer 9a, 9b are preferably formed at the same time. The third type of color filters 9 and fourth resin layer 9a, 9b may be formed by either a dry film process or a spin coating process, for example. In this process step, the fourth resin layer 9a, 9b is preferably provided on the third resin layer 8a, 8b, thereby completing the multilayer structures 12a and 12b.

Figure 23E:
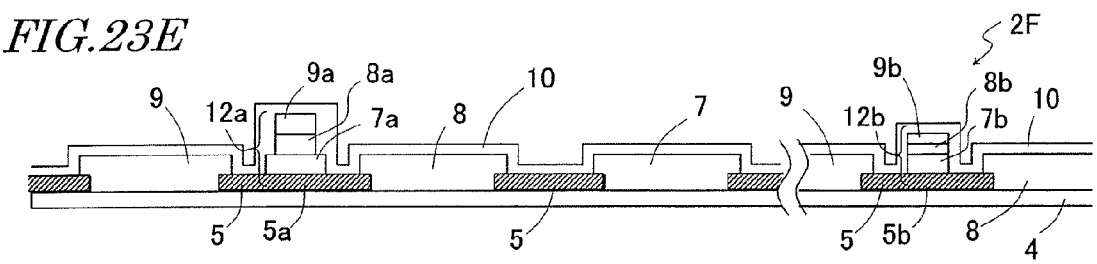

Subsequently, as shown in FIG. 23E, a common electrode 10 is preferably formed to complete the color filter substrate 2F. The common electrode 10 may be made of a trans-parent conductive material such as ITO and may be deposited by a sputtering process, for example.

If the color filter substrate 2F is made by this process, the multilayer structures 12a and 12b are made of the same material and go through the same process steps but have mutually different heights. Specifically, the multilayer structure 12a including the portion 7a of the second resin layer with the greater area is higher than the multilayer structure 12b including the portion 7b of the second resin layer with the smaller area.

As described above, according to this embodiment, one of multiple resin layers included in the multilayer structures 12a and 12b has a number of portions with mutually different areas (or shapes), thereby making a difference between the heights of the multilayer structures 12a and 12b (i.e., the distances from a reference plane to the respective tops of the multilayer structures). Specifically, the second resin layer has a number of portions with respectively different areas in the embodiment described above. Alternatively, the heights of the multilayer structures may also be made different by making any other resin layer have portions with mutually different areas and/or shapes instead of, or in addition to, the second resin layer. The heights of the multilayer structures can be controlled by adjusting the areas and/or shapes of portions of at least one of the multiple resin layers (except the uppermost resin layer).

Various embodiments of the present invention described above provide a color filter substrate, in which the height of a columnar spacer can be controlled arbitrarily by a simple manufacturing process, and a method of making such a color filter substrate.

A color filter substrate according to an embodiment of the present invention can be used in not only an active-matrix-addressed LCD but also various color display devices including other types of display devices with a non-liquidcrystal display medium layer such as an electrophoretic layer.

While the present invention has been described with respect to embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Applications No. 2004-174693 filed in Japan on Jun. 11, 2004, the entire contents of which are hereby incorporated by reference.

What is claimed is:

1. A display device, comprising:
an active-matrix substrate including a plurality of switching elements that are arranged in matrix;
a color filter substrate arranged so as to face the active-matrix substrate; and
a display medium layer interposed between the active-matrix substrate and the color filter substrate,
wherein the color filter substrate includes:
a transparent substrate;
a light-shield layer and a color filter layer provided on the transparent substrate; and
a plurality of columnar spacers, which are made of a resin and provided to define a gap between the active-matrix substrate and the color filter substrate, wherein the light-shield layer includes switching element shielding portions to shield the switching elements from light, wherein the active-matrix substrate includes picture element electrodes, which are electrically connected to the switching elements, wherein the columnar spacers are arranged so as to overlap with the switching element shielding portions, and bottom ends of the columnar spacers extend to a height of the picture element electrodes, and wherein a columnar spacer overlaps a gate line connected to the switching element at a position offset from a center of the gate line with respect to a width direction of the gate line.

2. The display device of claim 1, wherein the columnar spacers are arranged so as not to overlap with the picture element electrodes.

3. The display device of claim 1, wherein the active-matrix substrate includes a plurality of gate lines extending in a first direction and a plurality of source lines extending in a direction that is not parallel to the first direction so as to make intersections with the gate lines, and wherein the columnar spacers are arranged so as not to overlap with any of the intersections between the gate lines and the source lines.

4. The display device of claim 1, wherein the display medium layer is a liquid crystal layer.

* * * * *